(12) United States Patent
Horesh et al.

(10) Patent No.: US 11,188,616 B2
(45) Date of Patent: Nov. 30, 2021

(54) MULTI-LINEAR DYNAMICAL MODEL REDUCTION

(71) Applicants: International Business Machines Corporation, Armonk, NY (US); Trustees of Tufts College, Medford, MA (US); Ramot at Tel Aviv University Ltd., Tel Aviv (IL)

(72) Inventors: Lior Horesh, North Salem, NY (US); Misha Elena Kilmer, Medford, MA (US); Haim Avron, Tel Aviv (IL); Jiani Zhang, Medford, MA (US)

(73) Assignees: International Business Machines Corporation, Armonk, NY (US); Trustees of Tufts College, Medford, MA (US); Ramot at Tel Aviv University Ltd., Tel Aviv (IL)

( * ) Notice: Subject to any disclaimer, the term of this patent is extended or adjusted under 35 U.S.C. 154(b) by 72 days.

(21) Appl. No.: 16/800,500

(22) Filed: Feb. 25, 2020

(65) Prior Publication Data

US 2021/0271730 A1    Sep. 2, 2021

(51) Int. Cl.
*G06F 17/13* (2006.01)
*G06F 16/28* (2019.01)
(Continued)

(52) U.S. Cl.
CPC .......... *G06F 17/13* (2013.01); *G06F 16/2477* (2019.01); *G06F 16/283* (2019.01); *G06F 17/153* (2013.01); *G06F 17/16* (2013.01)

(58) Field of Classification Search
None
See application file for complete search history.

(56) References Cited

U.S. PATENT DOCUMENTS

| 7,379,925 B2 | 5/2008 | Vasilescu et al. |
| 7,529,719 B2 | 5/2009 | Liu et al. |

(Continued)

FOREIGN PATENT DOCUMENTS

| CN | 102592309 B | 5/2014 |
| CN | 105654138 A | 6/2016 |

(Continued)

OTHER PUBLICATIONS

Willcox et al., Balanced model reduction via the proper orthogonal decomposition, AIAA Journal, vol. 40, No. 11, Nov. 2002, pp. 2323-2330, https://arc.aiaa.org/doi/abs/10.2514/2.1570.

(Continued)

*Primary Examiner* — Craig C Dorais
(74) *Attorney, Agent, or Firm* — Anthony Curro; Otterstedt, Wallace & Kammer, LLP

(57) ABSTRACT

An illustrative embodiment includes a method for solving a dynamical system. The method comprises: obtaining multidimensional snapshots representing respective discrete solutions of the dynamical system; storing the multidimensional snapshots within a snapshot tensor having an order of at least three; generating a basis for at least a subspace of a state space of the dynamical system at least in part by performing a decomposition of the snapshot tensor; deriving a reduced order model at least in part by using the basis to project the dynamical system from the state space onto the subspace; and solving the reduced order model of the dynamical system.

21 Claims, 11 Drawing Sheets

$A *_M B$ for invertible $M$

901 Define $\tilde{A} = A \times_3 M$, $\tilde{B} = B \times_3 M$,
902 for all $i = 1, \ldots, n$ do
903    $\tilde{C}_{:,:,i} = \tilde{A}_{:,:,i} \tilde{B}_{:,:,i}$
904 end for
905 Define $C = \tilde{C} \times_3 M^{-1}$. Now $C = A *_M B$.

(51) Int. Cl.
　　　*G06F 16/2458*　　(2019.01)
　　　*G06F 17/16*　　　(2006.01)
　　　*G06F 17/15*　　　(2006.01)

(56) References Cited

U.S. PATENT DOCUMENTS

| | | | |
|---|---|---|---|
| 10,337,315 | B2 | 7/2019 | Horesh et al. |
| 2007/0208547 | A1 | 9/2007 | Graglia et al. |
| 2017/0220925 | A1 | 8/2017 | Alsharif et al. |
| 2019/0080210 | A1* | 3/2019 | Owechko ............. G06K 9/6293 |
| 2019/0205696 | A1* | 7/2019 | Owechko ................. G06F 17/16 |

FOREIGN PATENT DOCUMENTS

| | | |
|---|---|---|
| CN | 107808166 A | 3/2018 |
| CN | 109255374 A | 1/2019 |
| CN | 105427345 B | 4/2019 |
| CN | 109885628 A | 6/2019 |

OTHER PUBLICATIONS

Insuasty et al., Tensor-based reduced order modeling in reservoir engineering: An application to production optimization, 2nd International Federation of Automatic Control (IFAC) Workshop on Automatic Control in Offshore Oil and Gas Production (OOGP), vol. 48, No. 6, May 2015, pp. 254-259, https://www.sciencedirect.com/science/article/pii/S2405896315009076.

Bishop, Pattern recognition and machine learning, Springer, 2006, https://www.microsoft.com/en-us/research/uploads/prod/2006/01/Bishop-Pattern-Recognition-and-Machine-Learning-2006.pdf.

Kilmer et al., Factorization strategies for third-order tensors, Linear Algebra and its Applications, vol. 435, No. 3, Aug. 2011, pp. 641-658, https://www.sciencedirect.com/science/article/pii/S0024379510004830.

Hao et al., Nonnegative tensor decomposition, Ch. 5, Compressed Sensing & Sparse Filtering, pp. 123-148, Springer, 2014, https://link.springer.com/chapter/10.1007/978-3-642-38398-4_5.

Soltani et al., A tensor-based dictionary learning approach to tomographic image reconstruction, BIT Numerical Mathematics 56, No. 4, 2016, pp. 1425-1454, https://link.springer.com/article/10.1007/s10543-016-0607-z.

Newman et al., Image classification using local tensor singular value decompositions, 2017 IEEE 7th International Workshop on Computational Advances in Multi-Sensor Adaptive Processing (CAMSAP), Dec. 2017, 5 pages, https://ieeexplore.ieee.org/document/8313137.

Ivanov et al., Head pose estimation using multilinear subspace analysis for robot human awareness, 2009 IEEE 12th International Conference on Computer Vision (ICCV) Workshops, 2009, pp. 227-233, https://ieeexplore.ieee.org/document/5457694.

Shi et al., Multi-target tracking with motion context in tensor power iteration, Proceedings of the IEEE Conference on Computer Vision and Pattern Recognition (CVPR), pp. 3518-3525, Jun. 2014, https://ieeexplore.ieee.org/document/6909845.

Kernfeld et al., Tensor-tensor products with invertible linear transforms. Linear Algebra and its Applications, vol. 485, Nov. 2015, pp. 545-570, https://www.sciencedirect.com/science/article/abs/pii/S0024379515004358.

De Silva et al., Tensor Rank and the Ill-Posedness of the Best Low-Rank Approximation Problem, SIAM Journal on Matrix Analysis and Applications, vol. 30, No. 3, 2008, pp. 1084-1127, https://epubs.siam.org/doi/abs/10.1137/06066518X.

Hitchcock, The Expression of a Tensor or a Polyadic as a Sum of Products, Journal of Mathematics and Physics, vol. 6, Issue 1-4, Apr. 1927, pp. 164-189, https://onlinelibrary.wiley.com/doi/abs/10.1002/sapm192761164.

Harshman, Foundations of the PARAFAC procedure: Models and conditions for an íexplanatoryî multimodal factor analysis, UCLA Working Papers in Phonetics, 16, pp. 1-84. (University Microfilms, Ann Arbor, Michigan, No. 10,085). 1970.

Carroll et al., Analysis of individual differences in multidimensional scaling via an n-way generalization of "Eckart-Young" decomposition, Psychometrika, Sep. 1970, vol. 35, Issue 3, pp. 283-319, https://link.springer.com/article/10.1007%2FBF02310791.

De Lathauwer et al., A Multilinear Singular Value Decomposition, SIAM Journal on Matrix Analysis and Applications, vol. 21, Issue 4, pp. 1253-1278, 2000, https://epubs.siam.org/doi/10.1137/S0895479896305696.

Cichocki et al., Nonnegative Matrix and Tensor Factorizations: Applications to Exploratory Multi-Way Data Analysis and Blind Source Separation, John Wiley & Sons, 2009, https://onlinelibrary.wiley.com/doi/book/10.1002/9780470747278.

Tucker, Implications of Factor Analysis of Three-Way Matrices for Measurement of Change, Ch. 7, Problems in Measuring Change, pp. 122-137, University of Wisconsin Press, 1963.

Kilmer et al., Third-Order Tensors as Operators on Matrices: A Theoretical and Computational Framework with Applications in Imaging, SIAM Journal on Matrix Analysis and Applications, vol. 34, Issue 1, 2013, pp. 148-172, bttps://epubs.siam.org/doi/abs/10.1137/110837711.

Hao et al., Facial Recognition Using Tensor-Tensor Decompositions, SIAM Journal on Imaging Sciences, vol. 6, Issue 1, pp. 437-463, 2013, https://epubs.siam.org/doi/abs/10.1137/110842570.

Horesh et al., U.S. Appl. No. 16/289,064, filed Feb. 28, 2019, 66 pages.

Zhang, Design and Application of Tensor Decompositions to Problems in Model and Image Compression and Analysis, Ph.D. dissertation, Tufts University Department of Mathematics, May 2017, 114 pages, https://dl.tufts.edu/concern/pdfs/2b88qq41w.

Haber et al., Stable architectures for deep neural networks, Inverse Problems, vol. 34, No. 1, Art. 014004, Jan. 2018, 22 pages, https://iopscience.iop.org/article/10.1088/1361-6420/aa9a90/pdf.

Shekhawat et al., On the problem of low rank approximation of tensors, 21st International Symposium on Mathematical Theory of Networks and Systems (MTNS). Jul. 2014, pp. 1478-1485, http://fwn06.housing.rug.nl/mtns2014-papers/fullPapers/0386.pdf.

Bui-Thanh et al., Aerodynamic Data Reconstruction and Inverse Design Using Proper Orthogonal Decomposition, AIAA Journal, vol. 42, No. 8, Aug. 2004, pp. 1505-1516, https://arc.aiaa.org/doi/abs/10.2514/1.2159.

Roderick et al., Proper orthogonal decompositions in multifidelity uncertainty quantification of complex simulation models, International Journal of Computer Mathematics, vol. 91, No. 4, Apr. 2014, pp. 748-769, https://www.tandfonline.com/doi/abs/10.1080/00207160.2013.844431.

Newman et al., Stable Tensor Neural Networks for Rapid Deep Learning, Nov. 15, 2018, 20 pages, https://arxiv.org/pdf/1811.06569v1.pdf.

Niu et al., Recurrent Neural Networks in the Eye of Differential Equations, Apr. 29, 2019, 33 pages, https://arxiv.org/pdf/1904.12933v1.pdf.

Kilmer et al., Tensor-Tensor Products for Optimal Representation and Compression, Dec. 31, 2019, 27 pages, https://arxiv.org/pdf/2001.00046v1.pdf.

* cited by examiner

FIG. 1A
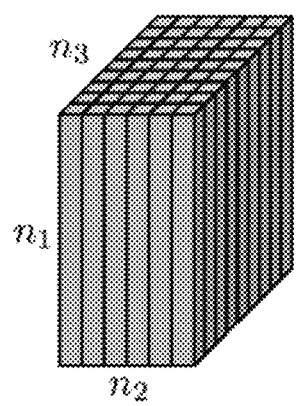
column fibers: $\mathcal{A}(:,j,k)$
FIG. 1B
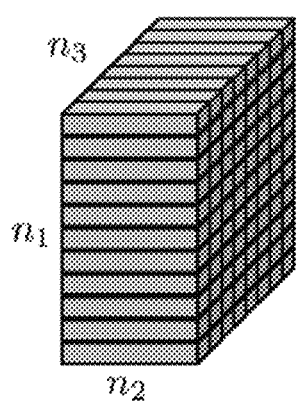
row fibers: $\mathcal{A}(i,:,k)$
FIG. 1C
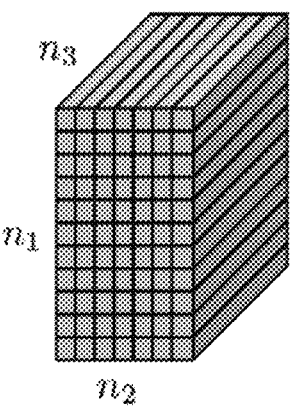
tube fibers: $\mathcal{A}(i,j,:)$
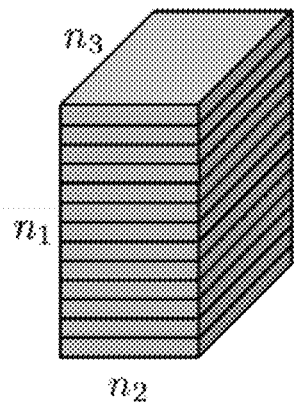
horizontal slices: $\mathcal{A}(i,:,:)$
FIG. 1D
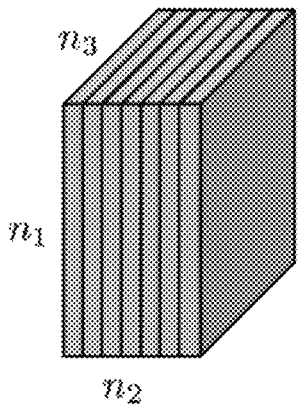
lateral slices: $\mathcal{A}(:,j,:)$
FIG. 1E
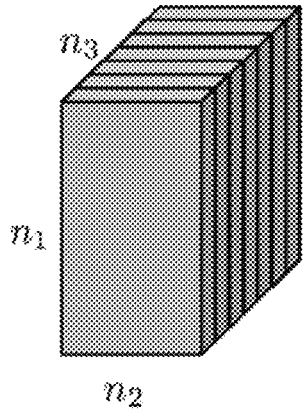
frontal slices: $\mathcal{A}(:,:,k)$
FIG. 1F

FIG. 2

| | t-product |
|---|---|
| 201 | Input: $\mathcal{A} \in \mathbb{R}^{n_1 \times n_2 \times n_3}$ and $\mathcal{B} \in \mathbb{R}^{n_2 \times n_4 \times n_3}$ |
| 202 | Output: A $n_1 \times n_4 \times n_3$ tensor $\mathcal{C}$, $\mathcal{C} = \mathcal{A} * \mathcal{B}$ |
| 203 | $\hat{\mathcal{A}} \leftarrow \text{fft}(\mathcal{A}, [], 3)$; |
| 204 | $\hat{\mathcal{B}} \leftarrow \text{fft}(\mathcal{B}, [], 3)$; |
| 205 | for $i = 1$ to $n_3$ do |
| 206 | $\hat{\mathcal{C}}(:,:,i) = \hat{\mathcal{A}}(:,:,i)\hat{\mathcal{B}}(:,:,i)$ |
| 207 | end for |
| 208 | $\mathcal{C} \leftarrow \text{ifft}(\hat{\mathcal{C}}, [], 3)$ |

FIG. 3

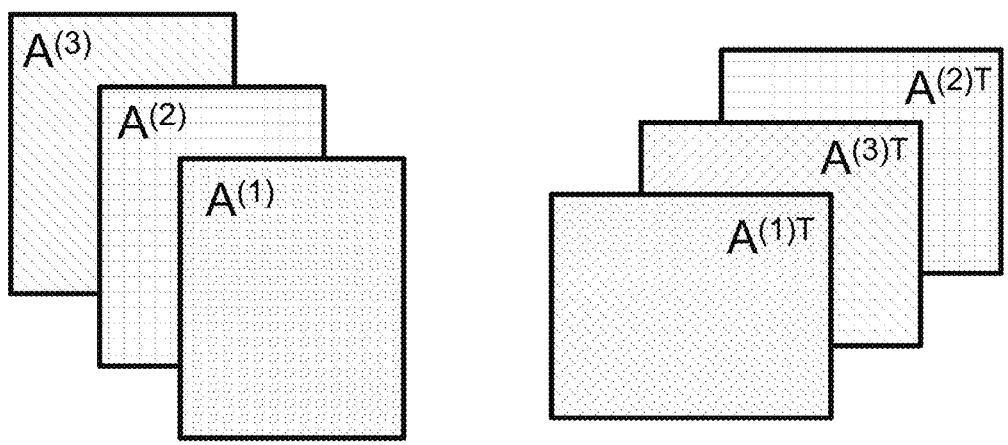

FIG. 4

410 $\mathcal{A}$ = 420 $\mathcal{W}$ * 430 $\mathcal{S}$ * 440 $\mathcal{V}^\top$

FIG. 5

| k-term truncated t-SVD |
|---|
| 501 Input: $\mathcal{A} \in \mathbb{R}^{n_1 \times n_2 \times n_3}$ and target truncation term $k$ |
| 502 Output: $\mathcal{W}_k \in \mathbb{R}^{n_1 \times k \times n_3}$, $\mathcal{S}_k \in \mathbb{R}^{k \times k \times n_3}$, and $\mathcal{V}_k \in \mathbb{R}^{n_2 \times k \times n_3}$ |
| 503 $\hat{\mathcal{A}} \leftarrow \text{fft}(\mathcal{A}, [], 3)$; |
| 504 for $i = 1$ to $n_3$ do |
| 505     $[\mathbf{W}, \mathbf{S}, \mathbf{V}] = \text{svd}(\hat{\mathcal{A}}^{(i)})$; |
| 506     Form $\mathbf{W}_k, \mathbf{S}_k, \mathbf{V}_k$ by truncating $\mathbf{W}, \mathbf{S}$, and $\mathbf{V}$ with target truncation term $k$; |
| 507     $\hat{\mathcal{W}}_k(:,:,i) = \mathbf{W}_k$; |
| 508     $\hat{\mathcal{S}}_k(:,:,i) = \mathbf{S}_k$; |
| 509     $\hat{\mathcal{V}}_k(:,:,i) = \mathbf{V}_k$; |
| 510 end for |
| 511 $\mathcal{W}_k \leftarrow \text{ifft}(\hat{\mathcal{W}}_k, [], 3)$; |
| 512 $\mathcal{S}_k \leftarrow \text{ifft}(\hat{\mathcal{S}}_k, [], 3)$; |
| 513 $\mathcal{V}_k \leftarrow \text{ifft}(\hat{\mathcal{V}}_k, [], 3)$; |

FIG. 6

| Proper Orthogonal Decomposition |
|---|
| 601 Input: Snapshots of solution $\{u^1, u^2, \ldots, u^{\mu_s}\}$, $\mu_s$ is the number of snapshots, matrix $A$, and $t_s$ is the length of time grid |
| 602 Output: Solution $\{u^{\mu_s+1}, u^{\mu_s+2}, \ldots, u^{t_s}\}$ |
| 603 Set $X = [u^1, u^2, \ldots, u^{\mu_s}] \in \mathbb{R}^{n \times \mu_s}$ |
| 604 Compute the reduced SVD of $X$, $[W, S, V] = svd(X, 0)$; |
| 605 Set projector as $W_r = W(:, 1:r)$ |
| 606 Project $u^j$ to lower dimension, $\tilde{u}^j = W_r^T u^j$ |
| 607 Solve $\tilde{u}^j$ in the reduced size system when $j = \mu_s + 1, \mu_s + 2, \ldots, t_s$ by using the implicit Euler method |
| 608 Compute $u^j = W_r \tilde{u}^j$ when $j = \mu_s + 1, \mu_s + 2, \ldots, t_s$ |

FIG. 7

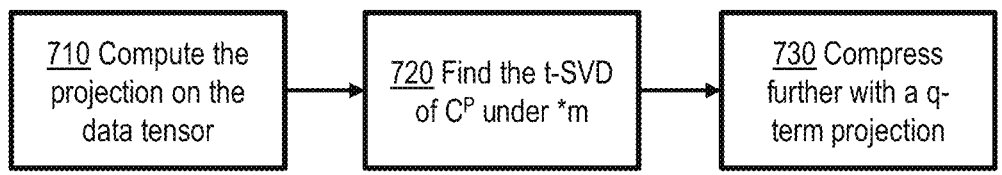

810 Spatial domain    830 Transform domain    850 Spatial domain

| $\mathcal{A} *_M \mathcal{B}$ for invertible M |
|---|
| 901 Define $\hat{\mathcal{A}} = \mathcal{A} \times_3 M$, $\hat{\mathcal{B}} = \mathcal{B} \times_3 M$. |
| 902 for all $i = 1, \ldots, n$ do |
| 903 $\quad \hat{\mathcal{C}}_{:,:,i} = \hat{\mathcal{A}}_{:,:,i} \hat{\mathcal{B}}_{:,:,i}$ |
| 904 end for |
| 905 Define $\mathcal{C} = \hat{\mathcal{C}} \times_3 M^{-1}$. Now $\mathcal{C} = \mathcal{A} *_M \mathcal{B}$. |

*FIG. 10*

| Full t-SVDM for $\mathcal{A}$ for given M a scalar multiple of a unitary matrix |
|---|
| $\hat{\mathcal{A}} \leftarrow \mathcal{A} \times_3 M$ <br> for all $i = 1, \ldots, n$: do <br> $\quad [\hat{\mathcal{U}}_{:,:,i}, \hat{\mathcal{S}}_{:,:,i}, \hat{\mathcal{V}}_{:,:,i}] = \text{svd}(\hat{\mathcal{A}}_{:,:,i})$ % note: rank $\hat{\mathcal{A}}_{:,:,i}$ is $\rho_i$. <br> end for <br> $\mathcal{U} = \hat{\mathcal{U}} \times_3 M^{-1}$, $\mathcal{S} = \hat{\mathcal{S}} \times_3 M^{-1}$, $\mathcal{V} = \hat{\mathcal{V}} \times_3 M^{-1}$. |

*FIG. 11*

| t-SVDII under $*_M$, $\rho$ to meet energy constraint. |
|---|
| INPUT: $\mathcal{A}$, M a multiple of unitary matrix; desired energy $\gamma \in (0, 1]$. <br> Compute t-SVDM of $\mathcal{A}$. <br> Concatinate all $(\hat{\mathcal{S}}_{j,j,i})^2$ for all $i, j$ into a vector v. <br> v $\leftarrow$ sort(v, 'descend'). <br> Let $w_k = \sum_{i=1}^{k} v_i$ be the vector of cumulative sums, $k = 1:\text{length}(v)$. <br> Find the first index $J$ such that $w_J / \|\hat{\mathcal{S}}\|_F^2 > \gamma$. <br> Determine the value, $\tau$, of the $\hat{\mathcal{S}}_{j,j,i}$ corresponding to this $J$. <br> for all $i = 1, \ldots, n$ do <br> $\quad$ Set $\rho_i$ as number of singular values for $\hat{\mathcal{A}}_{:,:,i}$ greater or equal to $\tau$. <br> $\quad$ Keep only the $m \times \rho_i$ $\hat{\mathcal{U}}_{:,1:\rho_i,i}$ and $\hat{\mathcal{G}}_\rho := \hat{\mathcal{S}}_{1:\rho_i,1:\rho_i,i} \hat{\mathcal{V}}^H_{:,1:\rho_i,i}$, $i = 1, \ldots, n$. <br> end for |

*FIG. 12A*

$$\frac{\partial u(\mathbf{r},t)}{\partial x} \approx \frac{1}{h_x} \begin{bmatrix} 1 & & & & \\ -1 & 1 & & & \\ & -1 & \ddots & & \\ & & \ddots & \ddots & \\ & & & -1 & 1 \end{bmatrix}_{(n_x+1) \times n_x} u(\mathbf{r}_{:,k},t),$$

*FIG. 12B*

$$\frac{\partial u(\mathbf{r},t)}{\partial y} \approx \frac{1}{h_y} \begin{bmatrix} 1 & & & & \\ -1 & 1 & & & \\ & -1 & \ddots & & \\ & & \ddots & \ddots & \\ & & & -1 & 1 \end{bmatrix}_{(n_y+1) \times n_y} u(\mathbf{r}_{i,:},t),$$

MULTI-LINEAR DYNAMICAL MODEL REDUCTION

BACKGROUND

The present invention relates to the electrical, electronic and computer arts, and, more particularly, to reduced order modeling and dimensionality reduction of physical models.

Much of real-world data is inherently multidimensional, and many operators and models are natively multi-way. By way of example, diagnostic medical imaging naturally involves three-dimensional (spatial) and four-dimensional (spatiotemporal), as does motion trajectory for self-driving cars. Other high-dimensional applications include machine vision (e.g., perspective, occlusions, illumination), natural language processing (e.g., latent semantic tensor indexing of co-occurring terms), and video processing (e.g., streaming, surveillance, motion signatures).

Dynamical models are instrumental in description, prediction, and design of complex systems and processes. Simulation of dynamics is instrumental for the description of a broad range of systems and phenomena, such as physical systems, biological systems, chemical reactions, finance, autonomous agents, optimal control, Internet of Things, neural networks, etc. Simulation is often embedded within end-goal objectives such as interface, design, control, or decision making under uncertainty. Simulation of large-scale, complex linear (or close to linear) systems is challenging computationally. In situations where simulation output is required instantaneously (e.g., real-time control systems) or at a rapid rate, such simulations often become intractable.

Model reduction techniques have been proposed to mitigate this fundamental problem. However, current methods for multi-dimensional model reduction are constrained by multiple factors. Data storage becomes excessively large, which could be particularly limiting if local processing upon a mobile device is essential, or communication of large volumes of data are required. Computation associated with derivation, simulation, control, or design of multi-dimensional dynamical systems is often a critical bottleneck, with scalability being a particular challenge. Many modeling approaches do not lend themselves to dynamic update. Parallelization is an issue: some procedures are more amenable than other to distributed (low communication) computation. Universality is also a problem: some model reduction mechanisms are efficient for specialized datasets or models, but do not apply for general dynamical systems.

Traditional model reduction techniques—including principal component analysis (PCA), singular vector decomposition (SVD), and proper orthogonal decomposition (POD)—are based on matrix computation and assume data vectorization (i.e., vectorized representation). These methods are agnostic to possible high-dimensional correlations associated with the behavior of the system, such as two-dimensional and/or three-dimensional objects evolving over time. Agnostic treatment of such high-dimensional correlations entails sub-optimal descriptions of the dynamics, and leads to low-fidelity simulations, excessive computation, and limited horizon predictions. Thus, existing frameworks for model reduction are sub-optimal for systems involving multi-dimensional correlations, which is problematic as data becomes increasingly complex and multidimensional.

SUMMARY

An illustrative embodiment includes a method for solving a dynamical system. The method comprises: obtaining multidimensional snapshots representing respective discrete solutions of the dynamical system; storing the multidimensional snapshots within a snapshot tensor having an order of at least three; generating a basis for at least a subspace of a state space of the dynamical system at least in part by performing a decomposition of the snapshot tensor; deriving a reduced order model at least in part by using the basis to project the dynamical system from the state space onto the subspace; and solving the reduced order model of the dynamical system.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Illustrative embodiments of the present invention have practical applications and provide technological improvements. Illustrative embodiments provide a dynamical model mechanism which leverages the inherent structure of the data to account for high-dimensional correlations intrinsically, and honors the dimensional integrity of the system. In illustrative embodiments, reduced model fidelity can be prescriptively controlled (as a trade-off with storage) in a fine-grained manner, and reduced models are provably optimal. Illustrative embodiments provide a consistent matrix-mimetic multidimensional data compression framework to facilitate improved storage reduction and computation efficiency. Thus, illustrative embodiments provide efficient computation, even in a parallel and/or distributed environment, and are amenable for an efficient hardware-accelerated substrate.

An illustrative embodiment of the invention provides a multi-directional tensor dynamic model reduction framework that offers superior representations of the solution space as well as the flexibility to entertain various invertible transformations in the product definition beyond fast Fourier transform (FFT). An illustrative embodiment provides multi-directional tensor decomposition in a specialized framework to address the dynamical model reduction problem that allows for superior orientation invariant representation. An illustrative embodiment provides a multi-directional, tensor-tensor proper orthogonal decomposition for dynamical system model reduction which is capable of entertaining any invertible transformations.

An illustrative embodiment provides dimensionality reduction of a known physical model—of any type—using singular vectors. Instead of a projection matrix, an illustrative embodiment employs a projection tensor in a consistent tensor algebra under a tensor model that allows for an orthogonal projection framework, thus requiring less training data while producing better (provably optimal rather than merely heuristic) approximations. By employing a snapshot tensor rather than a snapshot matrix, an illustrative embodiment avoids artificial flattening of inherently multi-dimensional data, a lossy process that inadvertently devoid the data from multi-dimensional correlations. In an illustrative embodiment, the use of a tensor-based method to obtain the projection basis allows the preservation of any inherently multi-dimensional correlations in the spatial dimensions, as well as the temporal dimension. An illustrative embodiment natively addresses dynamical systems and natively performs all computations (including the projections) in a tensorial fashion.

An illustrative embodiment can incorporate various types of tensor-tensor products within the same framework, which is advantageous as various tensor-tensor products can extract different types of features more efficiently.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 1A-1F show fibers and slices of an exemplary tensor suitable for use with an illustrative embodiment of the present invention.

FIG. 2 shows an exemplary procedure for computing t-products in parallel in accordance with an illustrative embodiment of the present invention.

FIG. 3 is a schematic illustrating a conjugate transpose suitable for use with an illustrative embodiment of the present invention.

FIG. 4 is a schematic illustrating t-SVD for tensor $\mathcal{A}$ shown in FIGS. 1A-1F in accordance with an illustrative embodiment of the present invention.

FIG. 5 shows an exemplary procedure for computing a k-term truncated t-SVD in accordance with an illustrative embodiment of the present invention.

FIG. 6 shows an exemplary procedure for proper orthogonal decomposition in accordance with an illustrative embodiment of the present invention.

FIG. 7 is a flowchart showing a tensor approximation/factorization technique in accordance with an illustrative embodiment of the present invention.

FIG. 10 shows an exemplary procedure for computing full t-SVDM in accordance with an illustrative embodiment of the present invention.

FIG. 11 shows an exemplary procedure for computing t-SVDII in accordance with an illustrative embodiment of the present invention.

FIGS. 12A and 12B show the components of discrete gradients in accordance with an illustrative embodiment of the present invention.

DETAILED DESCRIPTION

Figures 8, 9:
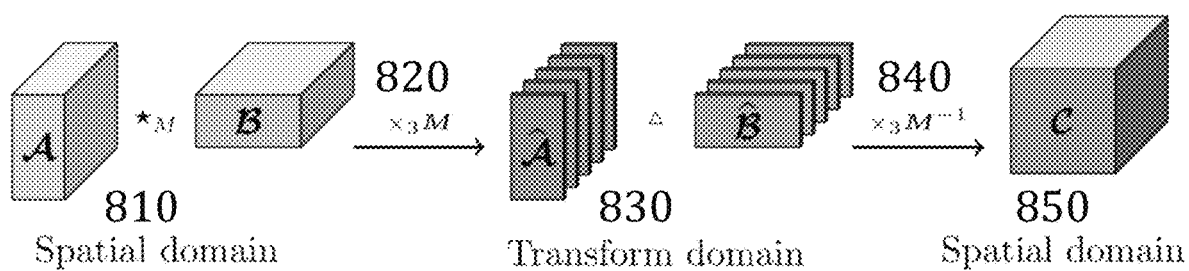
FIG. 8 is a schematic illustrating an m-product in accordance with an illustrative embodiment of the present invention.
FIG. 9 shows an exemplary procedure for computing m-products in accordance with an illustrative embodiment of the present invention.

A tensor is a multi-dimensional array, and the order of the tensor is defined as the number of dimensions of the array. As used herein, a tensor refers to a higher order generalization of a scalar (zeroth order tensor), a vector (first order tensor) and a matrix (second order tensor). More formally, a tensor $\mathcal{A} \in \mathbb{R}^{n_1 \times n_2 \times \cdots \times n_N}$ where N is the order of the tensor $\mathcal{A}$. Although embodiments of the present invention are primarily described herein with reference to third order tensors, one skilled in the art will understand that principles of the present invention may be applied to higher order tensors, e.g., if ordinary differential equations (ODEs) of more than two spatial dimensions are considered. A first order tensor will be referred to herein as a vector and denoted with lowercase bold and/or Fraktur letters such as $\mathfrak{a}$, a second order tensor will be referred to herein as a matrix and denoted with uppercase bold and/or Fraktur letters such as $\mathfrak{A}$. Mathematical (Euler) script letters such as $\mathcal{A}$ indicate third order tensors, or more generally higher order tensors (i.e., order ≥3). The present disclosure uses the MATLAB notation for entries, in which $\mathcal{A}$ (i, j, k) denotes the entry at row i and column j of the matrix going k inward. (MATLAB is a registered trademark of The MathWorks, Inc.)

FIGS. 1A-1F show fibers and slices of a $n_1 \times n_2 \times n_3$ tensor $\mathcal{A}$. A fiber is a vector defined by varying only one index while fixing the rest (e.g., the other two indices for a third order tensor). FIG. 1A shows column fibers $\mathcal{A}$ (:, j, k) where the i index is varied while the j and k indices are fixed. FIG. 1B shows row fibers $\mathcal{A}$ (i, :, k) where the j index is varied while the i and k indices are fixed. FIG. 1C shows tube fibers $\mathcal{A}$ (i, j, :) where the k index is varied while the i and j indices are fixed.

A slice is a matrix defined by varying only two indices while fixing the rest (e.g., the other one index for a third order tensor). FIG. 1D shows horizontal slices $\mathcal{A}$ (i, :, :) where the i index is fixed while the j and k indices are varied. FIG. 1E shows lateral slices $\mathcal{A}$ (:, i, :) where the j index is fixed while the i and k indices are varied. FIG. 1F shows frontal slices $\mathcal{A}$ (:, :, k) where the k index is fixed while the i and j indices are varied. For convenience, frontal slices may also be denoted herein with the form $A^{(k)}$.

Tensor decompositions which attempt to mimic properties of the matrix singular value decomposition (SVD) have been proposed. The most widely recognized tensor decompositions are the CANDECOMP/PARAFAC (CP) decomposition and Tucker decompositions. Numerous variations of Tucker decomposition have been proposed, including the High Order Singular Value Decomposition (HOSVD) discussed in De Lathauwer et al., "A Multilinear Singular Value Decomposition," SIAM Journal on Matrix Analysis and Applications, Volume 21, Issue 4, pp. 1253-1278, 2000, the entirety of which is incorporated by reference herein for all purposes. Insuasty et al., "Tensor-based reduced order modeling in reservoir engineering: An application to production optimization," 2nd International Federation of Automatic Control (IFAC) Workshop on Automatic Control in Offshore Oil and Gas Production (OOGP), Vol. 48, No. 6, May 2015, pp. 254-259, the entirety of which is incorporated by reference herein for all purposes, attempts to generalize proper orthogonal decomposition (POD) to tensors using CP and Tucker decompositions.

However, CP decomposition is problematic as the definition of CP tensor rank is ill-posed: unlike the matrix case, the rank cannot generally be computed in polynomial time, and without certain restrictions, an optimal rank-k approximation may not even exist. Moreover, the CP decomposition need not be orthogonal, and fitting CP for a given number of components is NP hard with no perfect and/or consistent procedure. While a Tucker decomposition can be computed in polynomial time and an orthogonal one will always exist, unlike the matrix counterpart, truncating the Tucker decomposition does not give an optimal approximation. Also, the Tucker decomposition can have either a diagonal core or orthogonal columns in components, but not both.

A framework of tensor SVD (t-SVD) based on a new tensor multiplication (t-product) was proposed by Kilmer et al., "Factorization strategies for third-order tensors," Linear Algebra and its Applications, Vol. 435, No. 3, Aug. 2011, pp. 641-658, the entirety of which is incorporated by reference herein for all purposes. The t-product was the first closed multiplicative operation between a pair of third order tensors of appropriate dimension.

If $\mathcal{A} \in \mathbb{R}^{l \times m \times n}$ with l×m frontal slices denoted $A^{(1)}$, then the corresponding block circulant matrix of size ln×mn is:

$$bcirc(\mathcal{A}) = \begin{bmatrix} A^{(1)} & A^{(n)} & A^{(n-1)} & \cdots & A^{(2)} \\ A^{(2)} & A^{(1)} & A^{(n)} & \cdots & A^{(3)} \\ \vdots & \ddots & \ddots & \ddots & \vdots \\ A^{(n)} & A^{(n-1)} & \ddots & A^{(2)} & A^{(1)} \end{bmatrix}$$

unfold($\mathcal{A}$) takes an l×m×n tensor and returns a block ln×m matrix corresponding to the first block column of bcirc($\mathcal{A}$), while fold($\mathcal{A}$) is the inverse:

$$unfold(\mathcal{A}) = \begin{bmatrix} A^{(1)} \\ A^{(2)} \\ \vdots \\ A^{(n)} \end{bmatrix}, fold(unfold(\mathcal{A})) = \mathcal{A}.$$

If $\mathcal{A}$ is a l×p×m tensor and $\mathcal{B}$ is a p×m×n tensor, then their t-product is the l×m×n tensor $\mathcal{A} * \mathcal{B} =$ fold(bcirc($\mathcal{A}$)·unfold($\mathcal{B}$)).

Note that as shown in FIG. 1C, a third order tensor $\mathcal{A} \in \mathbb{R}^{n_1 \times n_2 \times n_3}$ can be viewed as an $n_1 \times n_2$ matrix of tube fibers with size $1 \times 1 \times n_3$. Similar to matrices, the t-product $\mathcal{A} * \mathcal{B}$ will be defined if the number of columns of the leftmost tensor equals the number of rows of the rightmost tensor, and their respective tube fibers have the same dimension. The t-product of two tube fibers is equivalent to the circular convolution between them, and we note that convolution is a commutative operation. Hence, the t-product behaves as the matrix product, with the scalar operation replaced by convolution upon tube fibers.

Moreover, the t-product is based on a convolution-like operation, which can be implemented efficiently using the Fast Fourier Transform (FFT). The t-product, and factorizations based on t-products, are computed efficiently (and can be implemented to take advantage of parallelism) in the Fourier Transform (FT) domain. FIG. 2 shows an exemplary procedure for computing t-products in parallel in the Fourier domain. In lines 201, 203 and 204, inputs $\mathcal{A}$ and $\mathcal{B}$ are moved into the Fourier domain by taking FFTs along tube fibers. In lines 205-207, matrix-matrix products are computed to multiply frontal slices in parallel such that $\hat{\mathcal{C}} = \hat{\mathcal{A}} \Delta \hat{\mathcal{B}}$ where $\Delta$ is the face-wise product. In lines 202 and 208, output $\mathcal{C}$ is obtained by taking inverse FFTs along tube fibers.

The $n_1 \times n_2 \times n_3$ identity tensor $\mathcal{I}$ is the tensor whose first frontal slice $\mathcal{I}^{(1)}$ is the $n_1 \times n_2$ identity matrix and whose other frontal slices are all zeroes. If $\mathcal{A}$ is a $n_1 \times n_2 \times n_3$ tensor, then its conjugate transpose $\mathcal{A}^T$ is a $n_2 \times n_1 \times n_3$ tensor obtained by conjugate transposition of each of the frontal slices and then reversing the order of transposed frontal slices 2 through $n_3$. Because this tensor algebra is a module over a complex ring, these definitions hold over the complex field: thus, the transpose notation (e.g., $\mathcal{A}^T$) utilized herein for ease of presentation should be construed as encompassing complex conjugate transposes (e.g., $\mathcal{A}^H$).

FIG. 3 is a schematic illustrating the conjugate transpose. The third order tensor $\mathcal{A}$ on the left includes frontal slices $\mathcal{A}^{(1)}$ with a speckling pattern, $\mathcal{A}^{(2)}$ with a square grid pattern, and $\mathcal{A}^{(3)}$ with a diagonal grid pattern in order from front to back. In the conjugate transpose tensor, each of the frontal slices is transposed, but now the transposed frontal slices are arranged in order from front to back as $\mathcal{A}^{(1)T}$ with a speckling pattern, $\mathcal{A}^{(3)T}$ with a diagonal grid pattern, and $\mathcal{A}^{(2)T}$ with a square grid pattern.

A $n_1 \times n_2 \times n_3$ tensor $\mathcal{O}$ is orthogonal if $\mathcal{O}^T * \mathcal{O} = \mathcal{I} = \mathcal{O} * \mathcal{O}^T$. If $\mathcal{O}$ is $n_1 \times n_2 \times n_3$ with $n_1 \leq n_2$ and $\mathcal{O}(:,i,:)^T \mathcal{O}(:,j,:)$ yields a tube of zeroes when $i \neq j$ but equals the (1,1) tube fiber of $\mathcal{I}$ when $i=j$, then the lateral slices of $\mathcal{O}$ are orthonormal, analogous to the columns of an orthonormal matrix.

If $\mathcal{A}$ is a $n_1 \times n_2 \times n_3$ tensor, then the (full) t-SVD of $\mathcal{A}$ is:

$$\mathcal{A} = \mathcal{W} * \mathcal{S} * \mathcal{V}^T = \sum_{i=1}^{\min(n_1,n_2)} \mathcal{W}(:,i,:) * \mathcal{S}(i,i,:) * \mathcal{V}(:,i,:)^T$$

where $\mathcal{W} \in \mathbb{R}^{n_1 \times n_1 \times n_3}$, $\mathcal{V} \in \mathbb{R}^{n_2 \times n_2 \times n_3}$ are orthogonal, and $\mathcal{S}_k \in \mathbb{R}^{n_2 \times n_2 \times n_3}$ is a tensor whose frontal slices are diagonal (such a tensor is called f-diagonal). FIG. 4 illustrates t-SVD for tensor $\mathcal{A}$ in FIG. 1E. As shown in FIG. 4, the t-SVD of 410 $\mathcal{A} \in \mathbb{R}^{n_1 \times n_2 \times n_3}$ includes 420 $\mathcal{W} \in \mathbb{R}^{n_1 \times n_1 \times n_3}$ and 440 $\mathcal{V}^T \in \mathbb{R}^{n_2 \times n_2 \times n_3}$, which are orthogonal, and 430 $\mathcal{S} \in \mathbb{R}^{n_2 \times n_2 \times n_3}$, which is f-diagonal. Thus, t-SVD offers the use of orthogonal basis tensors while maintaining a diagonal structure on the tensor housing the singular tuples.

From the above equation, if $n_1 \geq n_2$, a reduced t-SVD can be obtained by restricting $\mathcal{W}$ to have only $n_2$ orthonormal columns, and $\mathcal{S}$ to be $n_2 \times n_2 \times n_3$. Truncating the t-SVD to k terms (i.e., where k is a target truncation term) provides a guaranteed optimal rank k approximation in the Frobenius norm, where the Frobenius norm of a tensor is the square root of the sum of the squares of all its entries. The Frobenius norm of a third order tensor $\mathcal{A} \in \mathbb{R}^{n_1 \times n_2 \times n_3}$ is defined as $$\|\mathcal{A}\|_F = \sqrt{\sum_{i=1}^{n_1} \sum_{j=1}^{n_2} \sum_{k=1}^{n_3} (\mathcal{A}(i,j,k))^2}.$$

The Eckart-Young theorem can be ended such that, given a tensor. $\mathcal{A} \in \mathbb{R}^{n_1 \times n_2 \times n_3}$, $$\mathcal{A}_k = \underset{\tilde{\mathcal{A}} \in \mathcal{M}}{\mathrm{argmin}} \|\mathcal{A} - \tilde{\mathcal{A}}\|$$

where $\mathcal{M} = \{\mathcal{C} = \mathcal{X} * \mathcal{Y} \mid \mathcal{X} \in \mathbb{R}^{n_1 \times k \times n_3*}, \mathcal{Y} \in \mathbb{R}^{k \times n_2 \times n_3}\}$. Therefore, the theoretical minimal error is given by $$\|\mathcal{A} - \mathcal{A}_k\|_F = \sqrt{\frac{1}{n_3} \sum_{i=1}^{n_3} \sum_{j=k+1}^{\min\{n_1,n_2\}} (\hat{\sigma}_j^{(i)})^2},$$

where $\hat{\sigma}_j^{(i)} = \hat{\mathcal{S}}(j,j,i)$ is the i-th component of fft( $\hat{\mathcal{S}}$ (j,j,:), [ ], 3).

FIG. 5 shows an exemplary procedure for computing a k-term truncated t-SVD which leverages the observation that since the t-product can be calculated in the Fourier domain as shown in FIG. 2, the t-SVD can also be calculated in the Fourier domain. Step 503 has an operation count of $O(n_1 n_2 n_3 \log(n_3))$. Step 505 has an operation count of $O(n_1 n_2 k)$ and is repeated $n_3$ times in steps 504-510 for a total operation count of $n_3 O(n_1 n_2 k)$. Step 511 has an operation count of $O(n_1 n_2 k \log(n_3))$. Each of steps 512 and 513 has an operation count of $O(k^2 n_3 \log(n_3))$.

Thus, for a tensor $\mathcal{A} \in \mathbb{R}^{n_1 \times n_2 \times n_3}$, computation of a k-term truncated t-SVD using the FIG. 5 procedure takes $O(n_1 n_2 n_3 k)$ flops. For a matrix $\mathfrak{A} \in \mathbb{R}^{n_1 \times n_2 \times n_3}$, computing a k-term truncated SVD takes $O(n_1 n_2 n_3 k)$ flops as well. However, the FIG. 5 procedure is embarrassingly parallel in the sense that the computation on the frontal slices is independent of each other. Accordingly, the FIG. 5 procedure can be computed in parallel over the frontal slices on a cluster, whereas typical procedures used for the truncated SVD of a matrix cannot be computed in parallel.

Differential equations are ubiquitous in machine vision applications such as optical flow, stereo, denoising, enhancement, segmentation, registration, neural networks, etc. A dynamical system which describes the evolution of a field in the two-dimensional spatial domain may be of the form:

$$\frac{\partial u(r,t)}{\partial t} - g(u(r,t)) - f(u(r,t)) = q(r,t) \quad (1)$$

where $\mathfrak{x} = (x, y)$ are the spatial dimensions, g and f are the linear and nonlinear operators determining the evolution of the system, respectively, and $q(\mathfrak{x}, t)$ is a non-homogeneous source term. Solving the dynamical system means finding unknown state $u(\mathfrak{x}, t)$ that satisfies the equation.

The analytical (exact) solution can be difficult to obtain or not even exist in practice, so leveraging numerical methods to compute an approximated solution is necessary. Instead of providing the variation of dependent variables continuously throughout the domain as analytical solutions, the numerical solutions can only provide answers at discrete points on a grid. Thus, the system shown in (1) can be solved by discretizing $u(\mathfrak{x}, t)$ both in space and time. The typical approach, independent of the dimension of the dynamical system, is to discretize in appropriate spatial dimensions, but then to recast the unknowns at a given time step as a vector. By discretizing the Partial Differential Equation (PDE) system (1) on a grid in the spatial domain (i.e., semi-discretization), the system (1) becomes an Ordinary Differential Equation (ODE) system. The ODE is then solved by discretizing it in the time domain and approximating $$\frac{\partial \mathfrak{u}(t)}{\partial t}.$$

For the sake of completeness, implicitly assume a set of boundary and initial conditions are imposed: the specifics of such choice is application dependent and of no fundamental influence to the proposed methodology. For simplicity, the present disclosure primarily describes discretization on regular spatial and temporal grids, but the formulation applies to arbitrary higher dimensional structures. For the sake of expositional simplicity, assume that the spatial domain is two-dimensional with rectangular boundary: $\Omega = [a_s, a_e] \times [b_s, b_e]$. Although this illustrative embodiment employs a finite difference discretization scheme, other forms can be considered in the same framework. Let $\mathfrak{x}_{i,l} = (x_i, y_l) = (a_s + ih_x, b_s + lh_y)$ where:

$$h_x = \frac{a_e - a_s}{N_x - 1}; h_y = \frac{b_e - b_s}{N_y - 1}; i = 0, \ldots, N_x - 1; l = 0, \ldots, N_y - 1$$

Let $\bar{\mathfrak{u}}(t)_{p(i,l)} = u(\mathfrak{x}_{i,l}, t)$, where p is some scheme to map indices in $\mathfrak{x}$ to indices in $\bar{\mathfrak{u}}$. Thus, $\bar{\mathfrak{u}}(t)$ is a column vector constructed by raster scanning the semi-discretized $u(\mathfrak{x}, t)$. In this illustrative embodiment, assume a lexicographical ordering first in x then in y: $p = (i-1)N_x + j$. Thus, a discretization, and more particularly a semi-discretization over space, of (1) is given by:

$$\frac{\partial \mathfrak{u}(t)}{\partial t} = \mathfrak{U}\mathfrak{u}(t) + f(\mathfrak{u}(t)) + \bar{\mathfrak{q}}(t), t \geq 0 \quad (2)$$

where $\mathfrak{U} \in \mathbb{R}^{n \times n}$ is the discretization of the operator g, where $n = N_x N_y$, and $\bar{\mathfrak{q}}(t)$ is a discretization of $q(\mathfrak{x}, t)$ under the same ordering scheme.

There are numerous options for approximating $\bar{\mathfrak{u}}(t)$ in (2) at finite time points. The approaches are divided into explicit (e.g., forward Euler) and implicit (e.g., backward Euler, Newman, Runge-Kutta), per the assumption they take upon the availability of their support. Explicit Euler method uses forward approximation, implicit Euler method uses backward approximation, and Crank-Nicolson method uses the average of forward approximation and backward approximation. Implicit methods are often preferred for their unconditional stability, but such choice necessitates multiple solutions of systems of equations in order to update the solution, even when the non-linear term f is zero.

To appreciate this concern, it is sufficient to consider the implicit (i.e. backwards) Euler approach. Assuming a regular temporal grid and no non-linear term, $t_j=jh_t$, $j\in[0, t_s]$, define $\bar{u}_j=\bar{u}(t_j)$. Each step in the use of backward Euler to evolve the system at the grid point requires solving the system $$\left(\frac{1}{h_t}\mathcal{I}-\mathfrak{U}\right)\bar{u}_{j+1} = \frac{1}{h_t}\bar{u}_j + \bar{q}(t_j),$$

which can also be written as $$\frac{\bar{u}_{j+1}-\bar{u}_j}{h_t} = \mathfrak{U}\bar{u}_{j+1} + f(\bar{u}_{j+1}).$$

It should be noted that this specific choice of temporal discretization (forward Euler for 1st order ODE) is a specific example, and other temporal discretization schemes can interchangeably used.

For a two-dimensional case, if the size of the spatial grid $\mathfrak{r}$ is $n_x \times n_y$, then the size of $\bar{u}(t)$ is $n_x n_y \times 1$, and the size of $\mathfrak{U}$ is $n_x n_y \times n_x n_y$. Note that this procedure can also be applied to higher-dimensional domains, such as three-dimensional, four-dimensional, etc. In order to obtain a highly accurate solution, the number of spatial grid points may need to be quite large. However, the order of this system is $n_x n_y$, so it can be expensive to solve it when the spatial grid $\mathfrak{r}$ is large. As a consequence, the cost of solving the linear systems usually is the dominant cost for estimating the solution to the discrete ODE. Moreover, there are $t_s$ time steps, so the system has to be solved is times. If a non-linear term is present, the problem is further complicated, and solving the system requires the solution of quite a few additional linearized systems. The scale of the discrete problem is therefore often computationally challenging, which motivates the need for reduced space representation of the discrete problem.

Proper orthogonal decomposition (POD) is a well-established method that has been used for model reduction across a wide range of applications. POD is a projection-based approach in which the state of the system is composed of a linear combination of principal state representations. The main idea is to project the original large-scale system to a smaller system by forming a basis of the state space from a small number of snapshots of the solution, and more particularly by using the left singular basis obtained by singular value decomposition (SVD) at some number of time step instances. Thus, the POD method is designed to lower the computational cost by reducing the order of the system: projecting the original n-dimensional state space to some $r \ll n$ subspace (r is a parameter). More particularly, it constructs a smaller size approximation system of order $r \ll n$ by projecting the original large system with a reduced order orthonormal projection matrix. By forming an explicit basis for this r dimensional, all the computation can be performed in the reduced state space.

Snapshots are a small subset of the solution $\{\bar{u}^1, \bar{u}^2, \ldots, \bar{u}^{\mu_s}\}$ where $\mu_s$ is the number of snapshots. In the aforementioned two-dimensional domain comprising $n_x \times n_y$ grid points, $\bar{u} \in \mathbb{R}^{n_x n_y}$, though as noted above, this procedure can be extended to higher-dimensional domains, such as three-dimensional, four-dimensional, etc. by flattening the data into a matrix regardless of the original dimensions of the data structure. These snapshots are stored in a snapshot matrix $\mathfrak{X} \in \mathbb{R}^{n_x n_y \times \mu_s}$. Projection matrix $\mathfrak{Q} \in \mathbb{R}^{n_x n_y \times k}$ is selected to be the first k left singular vectors in the SVD of $\mathfrak{X}$. The first k left singular vectors of a snapshot matrix $\mathfrak{X}$ determined from discrete solutions of a dynamical system at previous steps is used to project the discretized dynamic system of equations to a lower dimension. Then, the lower dimensional system is evolved in time, resulting in substantial computational savings over evolution of the discretized system at the original scale. Estimates of the full scale solution are then computed through projections onto the space of the left singular vectors. Approximating $\bar{u}(t)$ by $\mathfrak{Q}\tilde{u}(t)$ and plugging into the system (2) produces $$\mathfrak{Q}\frac{\partial \tilde{u}(t)}{\partial t} = \mathfrak{U}\mathfrak{Q}\tilde{u}(t) + f(\mathfrak{Q}\tilde{u}(t)) + \bar{q}(t)$$

Next, apply the Galerkin projection $$\mathfrak{Q}^T\frac{\partial \tilde{u}(t)}{\partial t} = \mathfrak{Q}^T\mathfrak{U}\mathfrak{Q}\tilde{u}(t) + \mathfrak{Q}^Tf(\mathfrak{Q}\tilde{u}(t)) + \mathfrak{Q}^T\bar{q}(t)$$

where for this two-dimensional example $\mathfrak{Q}^T\mathfrak{U}\mathfrak{Q}$ is of size k×k, and $k \ll n_x n_y$. More generally, for a d-dimensional array, $k \ll n_1 \ldots n_d$ independent of the original problem dimensions (e.g., for a three-dimensional example, $k \ll n_x n_y n_z$).

Concretely, let $\mathfrak{b}_1, \ldots, \mathfrak{b}_r \in \mathbb{R}^n$ be an orthogonal basis for the projected state space. The projection operator on the subspace is $\mathfrak{P}_r = \mathfrak{P}\mathfrak{P}^T$ where $\mathfrak{P} = [\mathfrak{b}_1, \ldots, \mathfrak{b}_r]$. Let $\mathcal{F} \subseteq \mathbb{R}^n$ be the set of state vectors observed from the dynamical system given the initial/boundary conditions of interest, and the timespan of interest. It would be desirable to have $\bar{u} \approx \mathfrak{P}_r \bar{u} = \mathfrak{P}\mathfrak{P}^T \bar{u}$ for $u \in \mathcal{F}$. However, generally $\mathcal{F}$ is a complex set for which an explicit description is lacking. This limitation is circumvented by using a set of snapshots, $\bar{u}^{(1)}, \bar{u}^{(2)}, \ldots, \bar{u}^{(s)} \in \mathbb{R}^n$, state solutions computed at different instants in time and/or different initial/boundary conditions. It is generally assumed that $s \ll n$. If the parameter space is sampled well, the snapshots will represent $\mathcal{F}$ well. Thus, the aim is $\bar{u}^{(i)} \approx \mathfrak{P}\mathfrak{P}^T \bar{u}^{(i)}$ for $i=1, \ldots, s$.

To turn this into an optimization problem and find the basis, a least squares approach can be used. Let $\mathfrak{X} = [\bar{u}^{(1)}, \ldots, \bar{u}^{(s)}]$ denote the snapshot matrix of size n×s, and consider the following optimization problem:

$$\arg\min_{\mathfrak{B} \in \mathbb{R}^{n \times r}} \|\mathfrak{X} - \mathfrak{B}\mathfrak{B}^T \mathfrak{X}\|_F^2, \; s.t. \mathfrak{B}^T\mathfrak{B} = \mathfrak{I} \quad (3)$$

Let $\mathfrak{X} = \mathfrak{W}\mathfrak{S}\mathfrak{V}^T$ be the reduced SVD of the n×s matrix $\mathfrak{X}$. In this equation, $\mathfrak{W}$ is a n×s matrix with orthonormal columns (the left singular vectors), $\mathfrak{S}$ is a s×s diagonal matrix of real values ordered along the diagonal $\sigma_1 \geq \sigma_2 \geq \ldots \geq \sigma_r$ (the singular values), $\mathfrak{V}_s$ is an s×s matrix with orthonormal columns (the right singular values). The optimal solution of (3) consists of the first r, r≤s, left singular vectors of the snapshot matrix, i.e., the first r columns of $\mathfrak{W}$, a matrix which is denoted as $\mathfrak{W}_r$. (Note that, in general, POD assumes that r<s. As discussed below, this limitation is not shared by tensor-POD according to an embodiment of the invention.) It is easy to verify that the value of (3) at the minimum (i.e., the error of the approximation at the snapshots) is $$\|\mathcal{X} - \mathfrak{W}_r \mathfrak{W}_r^\top \mathcal{X}\|_F^2 = \sum_{i=r+1}^{s} \sigma_i^2$$

The reduced basis leads to the approximation $$\bar{u}(t) \approx \mathfrak{W}_r(\mathfrak{W}_r^T \bar{u}^{(j)}), \text{ where } (\mathfrak{W}_r^T \bar{u}^{(j)}) = \tilde{u}(t) \quad (4)$$

To get the reduced order problem, substitute (4) into (3) and apply a Galerkin projection. For simplicity, the embodiment discussed herein assumes that the Galerkin projection is to the same subspace, so $\mathfrak{W}_r^T$ is applied to both sides of the system. However, in general, a different subspace may be used. The resulting reduced order model is $$\frac{\partial \tilde{u}(t)}{\partial t} = \mathfrak{W}_r \mathfrak{A} \, \mathfrak{W}_r \tilde{u}\, (t) + \mathfrak{W}_r^\top f(\mathfrak{W}_r \, \tilde{u}\, (t)) + \mathfrak{W}_r^\top q(t) \quad (5)$$

where the size of $\mathfrak{A}_r := \mathfrak{W}_r^T \mathfrak{A} \, \mathfrak{W}_r$ is r×r, in contrast with the original n×n system.

Now a time evolution ODE solver can be applied to the reduced order model (5). For example, in the linear case when implicit Euler is used:

$$\left(\frac{1}{h_t}\mathfrak{I} - \mathfrak{A}_r\right)\tilde{u}_{j+1} = \frac{1}{h_t}\tilde{u}_j + \mathfrak{W}_r^\top q(t_j) \quad (6)$$

requiring a solve with r×r system, rather than an n×n system. As long as r<<n and $\mathfrak{A}_r$ can be readily obtained, the solution of the reduced order system should be substantially cheaper. To obtain an estimate of $\bar{u}_j$ from $\tilde{u}_j$ compute $\bar{u}_j = \mathfrak{W}_r \tilde{u}_j$.

Alternatively, consider a set of snapshots of the solution $\{\bar{u}^{(1)}, \bar{u}^{(2)}, \ldots, \bar{u}^{(\mu_s)}\}$ that is a small size subset of the solution. A basis for this set of snapshots is the solution to the following optimization problem analogous to (3):

$$\arg\min_{\{\phi_i\}_{i=1}^r} \sum_{j=1}^{\mu_s} \left\| \bar{u}^{(j)} - \sum_{i=1}^r \langle \bar{u}^{(j)}, \phi_i \rangle \phi_i \right\|_F^2 \text{ s.t. } \phi_i^T \phi_j = \quad (7)$$

$$\begin{cases} 0 & \text{if } i \neq j \\ 1, & \text{if } i = j \end{cases} i, j = 1, \ldots, r$$

The optimal solution of (7) is given by the first that r left singular vectors of a matrix $\mathcal{X}$ constructed using $\{\bar{u}^{(j)}\}_{j=1}^{\mu_s}$ as the columns. The truncated SVD of n×$\mu_s$ matrix is $\mathcal{X} = \mathfrak{W}_r \mathfrak{S}_r \mathfrak{V}_r^T$ where r≤$\mu_s$, and where the columns of $\mathfrak{W}_r \in \mathbb{R}^{n \times r}$ are left singular vectors which are orthogonal. Therefore, $\bar{u}^{(j)} \approx \mathfrak{W}_r \mathfrak{W}_r^T \bar{u}^{(j)}$ is the optimal approximation of $\bar{u}^{(j)}$ (in the least square sense) in span of $\{\mathfrak{W}_r(:,1), \mathfrak{W}_r(:,2), \ldots, \mathfrak{W}_r(:,r)\}$. The error of (7) is $$\sum_{j=1}^{\mu_s} \left\| \bar{u}^{(j)} - \sum_{i=1}^r \langle \bar{u}^{(j)}, \mathfrak{W}_r(:,i) \rangle \mathfrak{W}_r(:,i) \right\|_F^2 = \sum_{i=r+1}^{\mu_s} \sigma_i^2,$$

where $\sigma_1, \sigma_2, \ldots, \sigma_r$ are the diagonal entries of $\mathfrak{S}_r$.

Let $\tilde{u}^{(j)} = \mathfrak{W}_r^T \bar{u}^{(j)}$ and assume $\bar{u}^{(j)} = \mathfrak{W}_r \tilde{u}^{(j)}$. Then, apply Galerkin projection: multiply from the left by $\mathfrak{W}_r^T$. The discretized system (2) is replaced by the reduced order model (5), which can then be solved at a decreased computational cost due to it being of order r<<n. At each time step, estimate $\bar{u} \approx \mathfrak{W}_r \tilde{u}$. FIG. 6 shows an exemplary procedure for proper orthogonal decomposition suitable for use when implementing an illustrative embodiment of the present invention. See generally, e.g., Zhang, "Design and Application of Tensor Decompositions to Problems in Model and Image Compression and Analysis," Ph.D. dissertation, Tufts University Department of Mathematics, May 2017, 114 pages (hereinafter "Zhang"), the entirety of which is incorporated by reference herein for all purposes.

The performance of POD depends on the availability of snapshots and the effectiveness of the basis. However, in practice, there may only be a limited number of snapshots available to use and the behavior of the POD based approximation may not be directly applicable to its "nearby" state space. Conventional POD techniques do not generate a basis that can capture enough information using this limited number of snapshot to approximate the solutions off the snapshots. Rather, the traditional projection basis is obtained from a snapshot matrix whose columns are the vectorized solutions at various time steps. However, in situations where high dimensional correlations are prevalent (e.g. spatio-temporal), and in particular when multi-linear relations are perceived by linear (matrix) algebra based approach as non-linear, matrix-based POD provides either unstable or inaccurate reduced models. Moreover, because of its reliance upon matrix SVD, conventional POD does not account for high dimensional correlations intrinsically.

Illustrative embodiments of the present invention provide a novel POD-based approach that principally employs a snapshot tensor, instead of a snapshot matrix, wherein each snapshot is a 2D or 3D solution to a system of partial differential equations. The use of a snapshot tensor avoids artificial flattening of inherently multi-dimensional data into a matrix, which is a lossy process that may inadvertently devoid the data from multi-dimensional correlations. Indeed, the use of a tensor-based method to obtain the projection basis according to embodiments of the invention allows the preservation of any inherently multi-dimensional correlations in the spatial dimensions, as well as the temporal dimension. Thus, unlike its matrix-based counterpart, the tensor formulation inherently accounts for intrinsic multi-dimensional correlations, and thereby provides a better basis of the snapshots and demonstrably superior quality reduced models.

As previously noted, dynamical system (1) describes the evolution of a field in the two-dimensional spatial domain. Accordingly, at each single time point, the solution to the discrete dynamical system is effectively a matrix, and is represented as such by an illustrative embodiment of the present invention. Instead of reshaping the snapshots and storing them in vectors, an illustrative embodiment stores the snapshots in the lateral slices of a tensor and obtains a basis from them. Thus, rather than form snapshot matrix $\mathcal{X} \in \mathbb{R}^{n_x n_y \times \mu_s}$ as discussed above, an illustrative embodiment forms a snapshot tensor $\mathcal{X} \in \mathbb{R}^{n_x \times \mu_s \times n_y}$. The first k left singular vectors of snapshot tensor $\mathcal{X}$ determined from discrete solutions of a dynamical system at previous steps is used to project the discretized dynamic system of equations to a lower dimension. An illustrative embodiment may compute k-term truncated t-SVD $\mathcal{X}_k = \mathcal{W}_k * \mathcal{S}_k * \mathcal{V}_k^T$, e.g., using the procedure discussed above with reference to FIG. 5. $\mathcal{W}_k \in \mathbb{R}^{n_x \times k \times n_y}$ is used to define the projection, and the structure is utilized to compute the projected system. Then, the lower dimensional system is evolved in time, resulting in substantial computational savings over evolution of the discretized system at the original scale. Estimates of the full scale solution are then computed through projections onto the space of the left singular tensors.

Suppose there are $\mu_s$ snapshots. Store them in a tensor $\mathcal{X} \in \mathbb{R}^{n_x \times \mu_s \times n_y}$, where the j-th snapshot is in lateral slice $\mathcal{U}^{(j)} \in \mathbb{R}^{n_x \times 1 \times n_y}$. The basis for these snapshots is the solution of the following optimization problem, which is analogous to (7):

$$\arg\min_{\{\mathcal{B}_l\}_{l=1}^{k_1}} \left\| \mathcal{U}^{(j)} - \sum_{l=1}^{k_1} \mathcal{B}_l * \mathcal{B}_l^T * \mathcal{U}^{(j)} \right\|_F^2 \text{ s.t. } \mathcal{B}_l^T \mathcal{B}_m =$$

$$\begin{cases} 0 \in \mathbb{R}^{1 \times 1 \times n_y} & \text{if } l \neq m \\ \mathcal{J} \in \mathbb{R}^{1 \times 1 \times n_y} & \text{if } l = m \end{cases} l, m = 1 \ldots k_1$$

This is equivalent to finding a small optimal tensor $\mathcal{B}$ containing the basis $\{\mathcal{B}_1, \mathcal{B}_2, \ldots, \mathcal{B}_{k_1}\}$ as lateral slices, analogous to (3):

$$\arg\min_{\mathcal{B}} \|\mathcal{U}^{(j)} - \mathcal{B}*\mathcal{B}^T*\mathcal{U}^{(j)}\|_F^2, s.t. \mathcal{B}^T*\mathcal{B} = \mathcal{J} \in \mathbb{R}^{k_1 \times k_1 \times n_y}$$

Based on the aforementioned extension of Eckart-Young theorem, the optimal solution $\mathcal{B}$ is the first $k_1$ left singular slices of $\mathcal{U}$. The t-SVD of $\mathcal{X}$ is $\mathcal{W} * \mathcal{S} * \mathcal{V}^T$ where the first $k_1$ left singular slices are denoted $\mathcal{W}_{k_1}$. The basis obtained from t-SVD is $\mathcal{W}_{k_1} \in \mathbb{R}^{n_x \times k_1 \times n_y}$, and it may be used to construct a projector, e.g., using the techniques described in Zhang at Section 3.2.2 on pages 50-52.

Alternatively, let $\mathbf{u}^{(j)} \mathbb{R}^{N_x \times N_y}$ be the matrix obtained by reshaping the snapshot) into a matrix. The notation $\mathcal{U}^{(j)}$ denotes the $N_x \times 1 \times N_y$ tensor representation obtained by taking that matrix and simply twisting into the third dimension: for instance, $\mathcal{U}^{(j)}(3,1,4) = \mathbf{u}^{(j)}(3,4)$. It should be noted that this placement of the y axis in the third tensor dimension is somewhat arbitrary, and one could instead choose to place the x axis in the third dimension, leading to a completely different set of dimensions. In either case, the reshaping process of $\bar{\mathbf{u}}^{(j)}$ into $\mathcal{U}(j)$ should be such that $\bar{\mathbf{u}}^{(j)}$=unfold($\mathcal{U}^{(j)}$), which connects the tensor interpretation of the problem with the underlying dynamical system.

Mimicking the matrix-based POD discussion above, it is desirable to obtain an orthonormal tensor basis $\{\mathcal{B}_1, \mathcal{B}_2, \ldots, \mathcal{B}_\rho\}$ with $\mathcal{B}_i \in \mathbb{R}^{N_x \times 1 \times N_y}$ for the snapshots of the solution, oriented as tensors, i.e., $\mathcal{U}^{(1)}, \ldots, \mathcal{U}^{(s)}$. Let $\mathcal{X} = [\mathcal{U}^{(1)}, \ldots, \mathcal{U}^{(s)}]$ denote the snapshot tensor. The desired optimization problem is to find a tensor $\mathcal{B} \in \mathbb{R}^{N_x \times \rho \times N_y}$, satisfying, analogous to (3):

$$\arg\min_{\mathcal{B}} \|\mathcal{X} - \mathcal{B}*\mathcal{B}^T*\mathcal{X}\|_F^2, s.t. \mathcal{B}^T*\mathcal{B} = \mathcal{J}, \mathcal{B} \in \mathbb{R}^{N_x \times \rho \times N_y}$$

Based on the aforementioned extended Eckart-Young theorem, the optimal solution $\mathcal{B}$ is the left singular tensor obtained by t-SVD as discussed above. Namely, assume the data tensor $\mathcal{X}$ is $N_x \times s \times N_y$, with $s \leq N_x$, and compute the reduced t-SVD $\mathcal{X} = \mathcal{W} * \mathcal{S} * \mathcal{V}^T$ with $\mathcal{W}$ of size $N_x \times s \times N_y$. Next, set $\mathcal{B} = \mathcal{W}_\rho = \mathcal{W}(:,1:\rho,:)$, which is $N_x \times \rho \times N_y$ with $\rho \leq s$. Then assume $$\mathcal{U}^{(j)} \approx \mathcal{W}_\rho * \mathcal{W}_\rho^T * \mathcal{U}^{(j)} \text{ for all time points, where}$$
$$\mathcal{W}_\rho^T * \mathcal{U}^{(j)} = \mathcal{C}^{(j)} \in \mathbb{R}^{\rho \times 1 \times N_y}. \quad (8)$$

Building a reduced order model is simplest when the dynamical system can be written in terms of the t-product. As an example of this, consider the special case when the matrix $\mathfrak{A}$ is itself block circulant. This would be the case, for example, if $\mathfrak{A}$ represented a diffusion operator with periodic boundary conditions in the appropriate direction. The matrix-vector product between a block circulant matrix $\mathfrak{A}$ and vector $\mathfrak{v}$ can be equivalently expressed using the t-product as $\mathcal{A}*\mathcal{V}$, that is a third-order tensor $\mathcal{A}$ from the first block column of $\mathfrak{A}$, and a $N_x \times 1 \times N_y$ representation of $\mathfrak{v}$ obtained by reshaping the vector into a matrix and twisting the matrix into the third dimension. Thus, when $\mathfrak{A}$ has block circulant structure, the discrete dynamical system (2) can be rewritten in tensor form:

$$\frac{\partial \mathcal{U}(t)}{\partial t} = \mathcal{A}*\mathcal{U}(t) + \hat{f}(\mathcal{U}(t)) + \mathcal{Q}(t)$$

where $\mathcal{A}$ is such that $\mathfrak{A} = \text{circ}(\mathcal{A})$ and $\mathcal{Q}$ is a reshaping of $q(t)$ into an $N_x \times 1 \times N_y$ tensor, and likewise $\hat{f}$ is defined from f to account for the new shape dimensions.

It is now straightforward to write the reduced order problem for the above tensor system. For example, in the linear case, the reduced order model is $$\frac{\partial \mathcal{C}}{\partial t} = \mathcal{A}_\rho * \mathcal{C}(t) + \mathcal{W}_\rho^T * \mathcal{Q}(t)$$

where $\mathcal{A}_\rho = \mathcal{W}_\rho^T * \mathcal{A} * \mathcal{W}_\rho \in \mathbb{R}^{\rho \times \rho \times N_y}$ and $\mathcal{C} \in \mathbb{R}^{\rho \times 1 \times N_y}$. Because of the mathematical framework induced by the t-product, applying implicit Euler requires solution of a system analogous to $$\left(\frac{1}{h_t}\mathcal{J} - \mathcal{A}_\rho\right) * \mathcal{C}^{(j+1)} = \frac{1}{h_t}\mathcal{C}^{(j)} + \mathcal{W}_\rho^T + \mathcal{Q}(t_j). \quad (6)$$

As discussed above, t-products and factorizations and inversions are all performed in the Fourier domain. To implement this (assuming $\mathcal{Q} = 0$) would take $N_y$ solves of a $\rho \times \rho$ system, but all the solves could in theory be conducted in parallel assuming sufficient (e.g., $N_y$) processors. In that case, if working in the Fourier domain, the parallel cost of executing this would be the same as for executing a matrix POD with r=$\rho$.

However, it is not always the case that the matrix $\mathcal{W}$ has the desired special structure. In that case, the reduced model can be used within the matrix formulation of the dynamical system. As noted above, $\bar{\mathbf{u}}^{(j)}$=unfold($\mathcal{U}^{(j)}$), so in terms of matrices and vectors, equation (8) can be rewritten as:

$$\bar{\mathbf{u}}^{(j)} \approx \text{circ}(\mathcal{W}_\rho)(\text{circ}(\mathcal{W}_\rho^T)\bar{\mathbf{u}}^{(j)}). \quad (9)$$

At this point, one may proceed according to the matrix POD described above with reference to FIG. 6, defining $\mathfrak{W}_\rho := \text{circ}(\mathcal{W}_\rho)$ and incorporating that projection into (6). Computation of $\mathfrak{A}_\rho = \mathfrak{W}_\rho^T \mathfrak{A} \mathfrak{W}_\rho$ can be performed offline, leveraging any structure in $\mathfrak{A}$, along with the block circulant structure in $\mathfrak{W}_\rho$.

It is important to note that the size of $\mathfrak{A}_\rho$ is $\rho N_x \times \rho N_y$. On one hand, it should noted that while $\rho$ is still required to be smaller than s, $\rho N_y$ can in fact be larger than s, and thus this technique can extract a higher dimensional projection space than is possible using POD (which is limited to dimension s). As further discussed below, in a sense, more information can be extracted using tensor-POD than matrix-POD.

On the other hand, when $N_y=N_y=n$, the reduced model must be of order $\Omega(\sqrt{n})$. While this is clearly a substantial reduction from n, it is sometimes desirable to reduce to order to smaller sizes. The tensor-POD techniques discussed thus far are based on dimension reduction from one side only (one-sided tensor-POD). This desire for an even smaller model size, as well as the somewhat arbitrary choice of putting they axis in the third tensor dimension, suggests additional techniques which utilize multi-sided tensor-POD.

To set the stage, suppose $\mathcal{X}$ is an m×t×n tensor. Consider the mapping $\mathbb{R}^{m\times t\times n} \to \mathbb{R}^{n\times t\times m}$ induced by matrix-transposing each of the t lateral slices. As previously noted, a lateral slice of X will be an n×m matrix oriented into the third dimension. In MATLAB, this could be obtained by using the command permute($\mathcal{X}$,[3,2,1]). To keep the notation succinct, the superscript P will denote a tensor that has been permuted in this manner. In other words, $\mathcal{X}^P$= permute($\mathcal{X}$,[3,2,1]) and $(\mathcal{X}^P)^P=\mathcal{X}$.

The definition of the t-product is tied directly to the orientation. In other words, given $\mathcal{X}\in\mathbb{R}^{m\times t\times n}$, $\mathcal{X}$ could be viewed as an m×t matrix, with tube-fiber entries of length n. The elemental operation here is convolution on the tube-fibers. Let $\mathbb{K}_n$ denote the collection of tube fibers of n components. The t-product establishes ($\mathbb{K}_n$,*) as a commutative ring with the identity element being the tube fiber $e_1$ with a 1 in the (1,1,1) entry and zeros in the (1,1,i), i=2 . . . n entries. Because of this, ($\mathbb{K}_n$,*$^m$) is a free module: not quite a vector space since ($\mathcal{X}_n$,*) is a ring rather than a field, but the next best algebraic construct.

On the other hand, the same $\mathcal{X}$ could instead be viewed as an n×t matrix, with tubal elements entries of length m. Here the elemental operation is convolution of elements of length m. It is sometimes useful to distinguish between these two different rings/operations in the case that m≠n. Henceforth, $*_n$ indicates operation over the ring ($\mathbb{K}_n$,*) and $*_m$ indicates operation over the ring ($\mathbb{K}_m$,*).

If $\mathcal{X}=\mathcal{C}*_n\mathcal{B}$, typically there is no way to get a factorization of $\mathcal{X}^P$ over $*_m$. However, we have devised a novel compressed tensor approximation which permits such factorization. Suppose $\mathcal{X}=\mathcal{U}*_n\mathcal{S}*_n\mathcal{V}^T$ is m×t×n. Here, as earlier, a subscript on the tensor refers to the number of lateral slices of the tensor that are kept. For example, $\mathcal{U}_k$ denotes $\mathcal{U}(:,1:k,:)$.

FIG. 7 is a flowchart an exemplary compressed tensor approximation/factorization technique in accordance with an illustrative embodiment of the present invention. In step 710, compute the projection on data tensor $\mathcal{X}$: $\mathcal{U}_k^{T}*_n\mathcal{X}=\mathcal{C}\in\mathbb{K}_n^{k\times t}$. In step 720, find the t-SVD of $\mathcal{C}^P$ under $*_m$: $\mathcal{C}^P=\mathcal{Q}*_m\mathcal{D}*_m\mathcal{H}^T$. In step 730, use this t-SVD to compress further with q-term projection: $\mathcal{Q}_q^T*_m\mathcal{C}^P=:\mathcal{G}$ where $\mathcal{Q}_q$ is k×q×m and $\mathcal{G}$ is now k×t×q.

This technique provides an (implicit) approximation to X that can be generated via the tuple ($\mathcal{G}$, $\mathcal{Q}_q$, $\mathcal{U}_k$) and operators ($*_m$,$*_n$). Specifically, the approximation is $\mathcal{X}\approx\mathcal{Y}$ where $$\mathcal{Y}:=\mathcal{U}_k*_n(\mathcal{Q}_q*_m\mathcal{G})^P=\mathcal{U}_k*_n(\mathcal{Q}_q*_m\mathcal{Q}_q*_m(\mathcal{U}_k^{T}*_n\mathcal{X})^P)^P$$

In addition, since the compressed representations are optimal at each stage under their respective algebraic settings, the resulting approximation is optimal in the sense that this approximation $\mathcal{Y}$ is the best approximation in the Frobenius norm, with the error given as $\|\mathcal{X}-\mathcal{Y}\|_F^2=\|\mathcal{D}_{q+1:end,q+1:end,:}\|_F^2+\|\mathcal{S}_{k+1:end,k+1:end,:}\|_F^2$ This framework can be generalized to higher order tensor structures, incorporating additional directional ring operations. The same procedure can also be iteratively repeated over the rotated version of the tensor to offer further compression. Note that the error in this approximation differs from using the usual truncated t-SVD to k terms in the presence of the first term in the sum.

In order to use this new approximation scheme to build a projection and a reduced order model, one must first consider the action of permutation or transposition imposed upon lateral slices of the tensor. Let $\mathcal{V}$ be a k×1×n tensor. Let $\mathfrak{v}$ be the kn vector obtained by unwrapping $\mathcal{V}$ by columns, such that $\mathcal{V}(:,1,1)$ is the first subvector, $\mathcal{V}(:,1,2)$ is the second subvector, etc. Let $\tilde{\mathfrak{v}}$ be the kn vector obtained by unwrapping $\mathcal{V}$ by tube fibers. Then there exists a permutation matrix $\mathfrak{P}$ such that $\tilde{\mathfrak{v}}=\mathfrak{P}\mathfrak{v}$ and $\mathfrak{P}^T\tilde{\mathfrak{v}}=\mathfrak{v}$ To build the projection, the procedure discussed above with reference to FIG. 7 is used to build an approximation of the snapshot tensor $\mathcal{U}\approx\mathcal{W}_k*_n$ $(\mathcal{Q}_q*_m\mathcal{Q}_q^T*_m(\mathcal{U}_k^T*_n\mathcal{U})^P)^P$. In a manner similar to that discussed above with reference to equation (9), this can be written in matrix form as $\overline{\mathbf{u}}^{(j)}\approx\text{circ}(\mathcal{W}_k)\mathfrak{P}^T(\text{circ}(\mathcal{Q}_q)\text{circ}(\mathcal{Q}_q)^T\mathfrak{P}$ $\text{circ}(\mathcal{W}_k)\overline{\mathbf{u}}^{(j)})$. Accordingly, the desired matrix projector for the POD is the matrix with qk columns $\mathfrak{W}_{qk}:=\text{circ}(\mathcal{W}_k)\mathfrak{W}^T\text{circ}(\mathcal{Q}_q)$. The projected matrix $\mathfrak{W}_{qk}^T\mathfrak{U}\mathfrak{W}_{qk}$ is qk×qk. If the product qk is suitably small, one can attain an efficient, orientation-independent reduced order model.

One can now set $\overline{\mathbf{u}}^{(j)}\approx\mathfrak{W}_{qk}\mathfrak{W}_{qk}^T\overline{\mathbf{u}}^{(j)}$ and proceed with POD as discussed above with reference to FIG. 6. In practice, it may be preferable to keep the solution updates as tensors and apply the matrix products described by tensor manipulation. While it is required that q≤s and k≤s, it can still very much be the case that kq>s. Thus, the projected subspace can be of higher rank than the maximal rank extract using POD. Indeed, multi-sided tensor decomposition further reduces the dimension of the reduced model, and also renders it dimension-independent akin to the matrix counterpart.

An illustrative embodiment leverages the tensor t-product and related operators to formulate the dynamical system in the form of a tensor, and then uses the t-SVD to generate the basis of snapshots. As previously noted, building a reduced order model is simplest when the dynamical system can be written in terms of the t-product. However, one skilled in the art will appreciate that the t-product is a single instance of the $*_M$ (m-product) family of tensor-tensor products. Other tensor-tensor products from the $*_M$ family can be utilized as the corresponding linear algebraic framework allows one to elegantly generalize all classical numerical methods from linear algebra. See, e.g., Kilmer et al., "Third-Order Tensors as Operators on Matrices: A Theoretical and Computational Framework with Applications in Imaging, SIAM Journal on Matrix Analysis and Applications", Volume 34, Issue 1, 2013, pp. 148-172, the entirety of which is incorporated by reference herein for all purposes. Other invertible linear transforms (e.g., cosine, wavelet, etc.) can be considered in a similar framework. See, e.g., Kernfeld et al., "Tensor-tensor products with invertible linear transforms", Linear Algebra and its Applications, Vol. 485, Nov. 2015, pp. 545-570, the entirety of which is incorporated by reference herein for all purposes.

Given $\mathcal{A}\in\mathbb{R}^{l\times p\times n}$, $\mathcal{B}\in\mathbb{R}^{p\times m\times n}$, and an invertible n×n matrix $\mathfrak{M}$ then $\mathcal{C}=\mathcal{A}*_M\mathcal{B}=(\hat{\mathcal{A}}\Delta\hat{\mathcal{B}})\times_3\mathfrak{M}^{-1}$ where $\mathcal{C}\in\mathbb{R}^{l\times m\times n}$ and, as discussed above, $\Delta$ is a face-wise product multiplying the frontal slices in parallel. $x_3$ denotes the mode-3 product, where k-mode Teawr, multiplication of a tensor $\mathcal{A} \in \mathbb{R}^{n_1 \times n_2 \times \cdots \times n_d}$ with a matrix $\mathfrak{u} \in \mathbb{R}^{j \times n_k}$ is $\mathcal{A} \times_k \mathfrak{u}$ and is of size $n_1 \times \ldots n_{k-1} \times j \times n_{k+1} \times \ldots \times n_d$. Element-wise:

$$(\mathcal{A} \times_k \mathfrak{U})_{i_1 \ldots i_{k-1} j i_{k+1} \ldots i_d} = \sum_{i_k=1}^{n_d} a_{i_1 i_2 \ldots i_d} u_{j i_k}$$

Hat notation is used to denote the tensor in the transform domain specified by $\mathfrak{M}$. That is, $\hat{\mathcal{A}}$ is the result of applying $\mathfrak{M}$ along all tube fibers of $\mathcal{A}$. However, it would not be efficient to compute $\hat{\mathcal{A}}$ by looping over the tube fibers of $\mathcal{A}$ and applying $\mathfrak{M}$ to each tube fiber. $\hat{\mathcal{A}} = \mathcal{A} \times_3 \mathfrak{M}$, where $\times_3$ denotes the aforementioned mode-3 product. Also, $\hat{\mathcal{A}} = \text{fold}((\mathfrak{M} \otimes \mathcal{I}) \text{unfold}(\mathcal{A}))$ where $\otimes$ denotes the Kronecker product.

FIG. 8 is a schematic illustrating an m-product suitable for use with an illustrative embodiment of the present invention. 810 begins with tensors $\mathcal{A}$ and $\mathcal{B}$ in the spatial domain. 820 moves tensors $\mathcal{A}$ and $\mathcal{B}$ into the transform domain by performing mode-3 multiplication of tensors $\mathcal{A}$ and $\mathcal{B}$ with matrix $\mathfrak{M}$, which generates $\hat{\mathcal{A}}$ and $\hat{\mathcal{B}}$ in the transform domain. 830 includes computing $\hat{\mathcal{C}} = \hat{\mathcal{A}} \Delta \hat{\mathcal{B}}$ in the transform domain. 840 computes the inverse transform b performing mode-3 multiplication of tensor $\hat{\mathcal{C}}$ with the inverse of matrix $\mathfrak{M}$ to produce the final $\mathcal{C}$ in the spatial domain shown in 850.

FIG. 9 shows an exemplary procedure for computing m-products suitable for use with an illustrative embodiment of the present invention. Step 901 involves generating $\hat{\mathcal{A}}$ and $\hat{\mathcal{B}}$ in the transform domain by performing mode-3 multiplication of tensors $\mathcal{A}$ and $\mathcal{B}$ with matrix $\mathfrak{M}$, corresponding to 810-820 in FIG. 8. In steps 902-904, n matrix-matrix products are computed to multiply frontal slices in parallel such that $\hat{\mathcal{C}} = \hat{\mathcal{A}} \Delta \hat{\mathcal{B}}$ where $\Delta$ is the face-wise product. Steps 902-904 correspond to 830 in FIG. 8, and are also similar to steps 205-207 in FIG. 2 discussed above. Step 905 involves performing mode-3 multiplication of tensor $\hat{\mathcal{C}}$ with the inverse of matrix $\mathfrak{M}$ to produce $\mathcal{C}$ in the spatial domain, corresponding to 840-850 in FIG. 8.

Although the illustrative embodiments are discussed herein primarily with reference to the t-product, an illustrative embodiment of the present invention may be adapted to utilize another tensor-tensor product instead of or in addition to the t-product. The ability to incorporate various types of tensor-tensor products within the same framework is advantageous as different tensor-tensor products can extract different types of features more efficiently. While approaches relying exclusively on the t-product may be limited to directional decomposition and to FFT-based t-linear operation, an illustrative embodiment of the invention provides a multi-directional (e.g., multi-linear) proper orthogonal decomposition capable of entertaining any invertible transformation.

By way of example, an illustrative embodiment of the present invention may be adapted for use with an $*_M$-product as opposed to a t-product. This may involve, for example, replacing t-SVD discussed herein with reference to FIG. 5 with t-SVDM and/or t-SVDII. The m-product, t-SVDM and t-SVDII procedures are further described in, e.g., Kilmer et al., Tensor-Tensor Products for Optimal Representation and Compression, Dec. 31, 2019, 27 pages, and U.S. patent application Ser. No. 16/289,064, filed on Feb. 28, 2019 (hereinafter "Horesh"), both of which are incorporated by reference herein for all purposes. The present application and Horesh were, not later than the effective filing date of the present application, commonly owned by International Business Machines Corp.

If $\mathcal{A}$ is a m×p×n tensor, then the (full) $*_M$ tensor SVD (t-SVDM) of $\mathcal{A}$ is:

$$\mathcal{A} = \mathcal{U} *_M \mathcal{S} *_M \mathcal{V}^\dagger = \sum_{i=1}^{min(m,p)} \mathcal{U}(:,i,:) *_M \mathcal{S}(i,i:) *_M \mathcal{V}(:,i,:)^H$$

where $\mathcal{U} \in \mathbb{R}^{m \times m \times n}$, $\mathcal{V} \in \mathbb{R}^{p \times p \times n}$ are $*_M$-unitary, and $\mathcal{S}_k \in \mathbb{R}^{m \times p \times n}$ is a tensor whose frontal slices are diagonal (such a tensor is called f-diagonal). If m>p, one can derive a reduced t-SVDM by restricting $\mathcal{U}$ to have only p orthonormal columns, and $\mathcal{S}$ to be p×p×n as opposed to the full m×p×n. Similarly, if p>m, one needs only keep the m×m×n portion of $\mathcal{S}$ and the m columns of $\mathcal{V}$ to obtain the same representation.

FIG. 10 shows an procedure for full t-SVDM. Independent of the choice of matrix $\mathfrak{M}$, the components of the t-SVDM are computed in transform space, as discussed above with reference to FIG. 8. When $\mathfrak{M}$ is the (unnormalized) discrete Fourier transform (DFT) matrix, t-SVDM reduces to the t-product-based t-SVD discussed above with reference to FIG. 5.

The Eckart-Young theorem discussed above with reference to t-SVD also extends to t-SVDM in cases where $\mathfrak{M}$ is a non-zero multiple of a unitary matrix. The multi-rank of $\mathcal{A}$ under $*_M$ is the vector ρ such that its i-th entry $\rho_i$ denotes the rank of the i-th frontal slice of $\hat{\mathcal{A}}$. Given the t-SVDM of $\mathcal{A}$ under $*_M$, define $\mathcal{A}_\rho$ to be approximation having multi-rank ρ: $\mathcal{A}_\rho^{(i)} = \hat{\mathcal{U}}_{:,1:\rho_i,i} \hat{\mathcal{S}}_{1:\rho_i,1:\rho_i} \hat{\mathcal{V}}_{:,1:\rho_i,:}^H$.
Then $\mathcal{A}_\rho$ is the best multi-rank ρ approximation to $\hat{\mathcal{A}}$ in the Frobenius norm. This in turn can be used to generalize the idea of the t-SVDII to the $*_M$ product when $\mathfrak{M}$ is a scalar multiple of a unitary matrix. FIG. 11 shows an procedure for t-SVDII which provides a method for determining a realistic choice for multi-rank ρ.

There has been considerable skepticism regarding whether the inventive tensor-based approaches described herein can give gains when compared to conventional matrix-based approaches. After all, isn't the long-established basis given by the matrix SVD of the snapshot information already optimal? How can the tensor approach possibly do better, when, at the end of the day, the tensor-generated information is used to perform model order reduction in tensor space?However, both theoretical and empirical evidence demonstrates that illustrative embodiments of the present invention provide unexpected results relative to conventional techniques.

When comparing illustrative embodiments of the present invention to conventional techniques, this discussion focuses primarily on the single-sided t-SVD rather than the multi-sided techniques for ease of exposition. However, these findings can be extended to also include multi-sided techniques, which produce results at least comparable to, if not superior to, the single-sided approaches discussed herein.

In both conventional matrix POD and inventive tensor-based POD, the main computation cost is due to the computation of the basis and solving the reduced model. For the step of basis computation, using SVD and using t-SVD have a similar computation cost: $O(n_x^2 n_y^2 \mu_s)$. However, it is important to recall that, as discussed above with reference to FIG. 2, t-SVD can be computed in parallel over the frontal slices on a cluster, whereas typical procedures used for the computation of matrix based SVD cannot be performed in parallel. In the step of computing the reduced model, the size of the reduced model in tensor POD ($n_y\mu_s$) is larger than it is in matrix POD ($\mu s$). However, the computation cost of tensor POD can be decreased by reducing the model from two directions, as discussed above with reference to FIG. 7, and/or by leveraging t-SVDII, as discussed above with reference to FIG. 11. These improvements may not change the computation cost for computing the basis, but the size of the reduced model will be $c\mu_s$ where $c<<n_y$.

More particularly, the two-sided (or, more generally, multi-sided) approach allows for further reduction of the dimension of the tensor-based POD formulation while preserving the accuracy benefits of the full problem. In the two-sided tensor approach, the number of columns in the projection matrix $\mathcal{W}_{qk}$ is qk. The cost of a system solve using the reduced order model (ROM) based on the matrix-based POD and the cost of a system solve using the ROM using the ROM based on the two-sided tensor-based POD would be the same if qk=r.

Zhang at Section 3.2.1 gives theoretical proofs that show the basis obtained from t-SVD is more accurate than the basis obtained from conventional matrix-based SVD for the same k. If $\mathcal{X}$ is a $n_1 \times n_2 \times n_3$ tensor, then the first k terms of the t-SVD will be:

$$\mathcal{X}_k = \sum_{i=1}^{k} \mathcal{W}(:,i,:) * (\mathcal{S}(i,i,:) * \mathcal{V}(:,i,:)^T) = \sum_{i=1}^{k} \mathcal{W}(:,i,:) * \mathcal{C}(i,:,:).$$

The matrix $\mathbf{x}_j$ that represents the j-th lateral slice of $\mathcal{X}$ can be approximated as $$\mathbf{x}_j \approx \sum_{i=1}^{k} \mathfrak{W}_i circ(c_i^{(j)})$$

where $c_i^{(j)} = \mathcal{C}(i,j,:)$ is the (i,j)-th tube fiber. If $\hat{\mathbf{x}}(:,j) = vec(\mathbf{x}_j)$ and $$\hat{\mathbf{x}}_k = \sum_{i=1}^{k} \mathfrak{Q}(:,i)(\sum (i,i)\mathfrak{W}(:,i)^T) = \sum_{i=1}^{k} \mathfrak{Q}(:,i)\mathfrak{D}(i,:),$$

then $\|\mathcal{X} - \mathcal{X}_k\|_F \le \|\hat{\mathbf{x}} - \hat{\mathbf{x}}_k\|_F$ where $k \le \min(n_1, n_2, n_3)$ and $k \le \min(n_1 n_3, n_2)$ simultaneously. Thus, the approximation error for tensor-based techniques is lower than the approximation error for matrix-based techniques. This conclusion not only works for the model reduction of dynamical systems, but also applies in general regarding to comparison of SVD and tensor SVD in accuracy.

Suppose again that $\mathcal{U} \in \mathbb{R}^{m \times s \times n}$ is the snapshot tensor, and note that $\mathbf{u} := \text{unfold}(\mathcal{U})$ will give exactly the snapshot matrix. For ease of discussion, $\mathbf{u}_j$ represents the m×n matrix corresponding to the j-th lateral slice of $\mathcal{U}$. Note that the j-th column of the snapshot matrix, $\mathbf{u}_j$, is related to $\mathbf{u}_j$ as $\mathbf{u}_j = vec(\mathbf{u}_j)$. The truncated t-SVD solves the best tensor approximation problem:

$$\min \|\mathcal{U} - \mathcal{U}_k\|_F \text{ s.t. } \mathcal{U}_k = \sum_{i=1}^{k} \mathcal{Q}(:,i,:) * \mathcal{M}(i,:,:).$$

As noted above, the solution can be written in terms of the first k terms of the tensor-SVD:

$$\mathcal{U}_k = \sum_{i=1}^{k} \mathcal{W}(:,i,:) * (\mathcal{S}(i,i,:) * \mathcal{V}(:,i,:)^T) = \sum_{i=1}^{k} \mathcal{W}(:,i,:) * \mathcal{C}(i,:,:)$$

and $$\mathcal{U}(:,j,:) \approx \mathcal{U}_k(:,j,:) = \sum_{i=1}^{k} \mathcal{W}(:,i,:) * \mathcal{C}(i,:,:).$$

Set $\mathfrak{W}_i \in \mathbb{R}^{m \times n}$ as the matrix representation of $\mathcal{W}(:,i,:)$, e.g., using MATLAB's squeeze command. Let $c_i^{(j)}$ be the representation in $\mathbb{R}^n$ of the tube filter $\mathcal{C}(:,j,:)$. Observe that $$\mathbf{u}_j \approx \sum_{i=1}^{k} \mathfrak{W}_i circ(c_i^{(j)}).$$

The notation $circ(\mathbf{v})$ for $\mathbf{v} \in \mathcal{A}^n$ means n×n circulant matrix generated using $\mathbf{v}$ as the first column.

These observations provide one way of comparing the approximation from the truncated matrix SVD of $\mathbf{u}$ with the tensor approximation problem above. To begin, let $\mathbf{u} = \mathfrak{Q} \Sigma \mathfrak{V}^T$ be the SVD of $\mathbf{u}$. Note $\mathbf{u}$ is mn×t, and assume that mn>s, so that the rank of $\mathbf{u}$ is less than s. Choose a truncation $\rho \le s$. Thus, the j-th column of $\mathbf{u}$, $\bar{\mathbf{u}}_j$, is approximated as $$\bar{\mathbf{u}}_j \approx \sum_{i=1}^{\rho} \mathfrak{Q}(:,i) d_{ij},$$

where $d_{ij}$ is the j-th entry of the coefficient matrix $\Sigma(1:\rho, 1:\rho) * \mathfrak{V}(:,1:\rho)^T$. But recall $\bar{\mathbf{u}}_j$ is just $vec(\mathcal{U}_j)$. So if $\mathfrak{Q}(:,i)$ is also reshaped into $\mathfrak{Q}_i \in \mathbb{R}^{m \times n}$, the approximation given by the matrix SVD can be expressed according to $$\bar{\mathbf{u}}_j \approx \sum_{i=1}^{\rho} \mathfrak{Q}(:,i) d_{ij} = \sum_{i=1}^{\rho} \mathfrak{Q}_i circ(d_{ij} e_1),$$

where j=1, . . . , t. This can be converted into tensor form:

$$\mathcal{U} \sum_{i=1}^{\rho} \mathcal{Q}(:,i,:) * \mathcal{D}(i,:,:) =: \mathcal{Z}_k,$$

where $\mathcal{D}$ is a tensor with the matrix $\mathfrak{D}$ on the front face and zeroes elsewhere. For $\rho = k$, and assuming $k \le \min(n,s)$ and $\rho \le \text{rank}(\mathcal{U}) \le s \le \min(m,n)$, and $\mathcal{U}_k$ is the k-term best tensor approximation, then:

$$\sum_{i=k+1}^{min(m,s)} \|S(i,i,:)\|_F^2 =$$

$$\|\mathcal{U} - \mathcal{U}_k\|_F^2 \le \|\mathfrak{U} - \mathcal{Z}_k\|_F^2 = \left\|\mathfrak{U} - \sum_{i=1}^k \sigma_i q_i y_i^T\right\|_F^2 = \sum_{i=k+1}^{rank(\mathfrak{U})} \sigma_i^2$$

For a "skinny" data matrix, then, the tensor SVD gives an approximation to the same data that is at least as good, if not better, than the matrix SVD. Now, it is true that implicit storage of $\mathcal{U}_k$ costs more than storing $\mathfrak{U}_k$, however, the amount of storage required for the k left singular tensor slices vs. the k left singular vectors is identical. Thus, the tensor left singular factors are in general more informative than the matrix left singular vectors, provided that one leverages the power of the t-product. Even though the reduced discrete dynamical system may have been intermediately expressed in matrix form, the representation of the snapshots and future states is always interpreted using the proposed tensor approach, so more information can be extracted out of the snapshot data with the use of tensors compared with matrices.

It is important to realize, that despite the measure similarity (Frobenius norm), the matrix truncation and the tensor truncation approximations correspond to two different optimization problems, as they address different algebraic structures. As mentioned above, the matrix problem is dealing with vector spaces and in that context with scalar multiplication as the elemental operation. In contrast, the tensor problem is dealing with algebraic modules, whose elements are tube fibers, and the respective elemental operation is the t-product between two tube fibers.

Since it is possible for a non-zero tube fiber to be non-invertible, these elements do not form a field, and hence, along with the elemental operation, they do not form vector spaces, but rather rings and modules as noted earlier. Yet, the notion of basis does exist. The action of $\mathcal{A}$ on $\mathcal{X} \in \mathbb{R}^{p \times 1 \times n}$ when $\mathcal{A} \in \mathbb{R}^{m \times p \times n}$ is essentially t-linear (rather than linear), $\mathcal{A} * (\mathcal{X} * c + \mathcal{Y} * d) = (\mathcal{A} * \mathcal{X}) * c + (\mathcal{A} * \mathcal{Y}) * d$, where c and d are any tube fibers of length n. Note that they cannot be put on the left because the t-product definition does not apply that way.

Another way to gain intuition into the superiority of the tensor decomposition is through observation of the range spaces. Let us assume for instance that the data tensor is n×n×n. Following the conventional matrix vectorization conduct, that implies a data matrix of $n^2 \times n$. The range of the entailed data matrix cannot exceed n, and therefore the n left singular vectors do not span $\mathbb{R}^{n^2}$. Conversely, the left singular tensor would be n×n×n, and its n slices would effectively span the space of all tensors of size n×n×n (i.e., a basis for the module), provided that the tensor is invertible, one can reconstruct that entire space as the range. Indeed, in practice, the data matrices may not have in columns, but the idea is the same: using * and t-linear constructions, more information is available to us from the same data. As noted above, an illustrative embodiment may additionally or alternatively use tensor-tensor products other than the t-product, and thus may be multi-linear rather than t-linear.

Experimental results generated using an illustrative embodiment of the present invention provide empirical evidence of unexpected results and significant advantages relative to conventional arrangements. These results were generated for an application involving a linear diffusion problem with Dirichlet boundary condition:

$$\frac{\partial u(\mathfrak{r},t)}{\partial t} - \nabla \cdot (\kappa(\mathfrak{r},t) \nabla u(\mathfrak{r},t)) = q(\mathfrak{r},t) \quad (10)$$

where $u(\mathfrak{r},t)$ is the state, $\mathfrak{r} = (x,y)$ denotes the spatial coordinates, K is the diffusion coefficient, and $q(\mathfrak{r},t)$ is the source term for experiments.

The gradient of u is defined as $$\nabla u(\mathfrak{r},t) = \left(\frac{\partial u(\mathfrak{r},t)}{\partial x}, \frac{\partial u(\mathfrak{r},t)}{\partial y}\right).$$

Employing a second order finite difference discretization scheme, the components of the discrete gradients are as shown in FIGS. 12A and 12B. FIG. 12A shows the components of the discrete gradients with a fixed k, and FIG. 12B shows the components of the discrete gradients with a fixed i. For convenience, the $(n_x+1) \times n_x$ lower bidiagonal matrix in FIG. 12A is denoted as $\mathfrak{G}_x$, and the $(n_y+1) \times n_y$ lower bidiagonal matrix in FIG. 12B is denoted as $\mathfrak{G}_y$.

Let $n = n_x n_y$, and $\bar{\mathfrak{u}}(t)$ be a column vector with size n constructed by raster scanning $u(\mathfrak{r}_{i,k},t)$ column by column. Then $\nabla \bar{\mathfrak{u}}(t) \approx \mathfrak{L} \bar{\mathfrak{u}}(t)$ where $$\mathfrak{L} = \left(\frac{1}{h_x} \mathfrak{I}_{n_y} \otimes \mathfrak{G}_x, \frac{1}{h_y} \mathfrak{G}_y \otimes \mathfrak{I}_x\right)^T$$

is a n×n matrix with size s, and $\otimes$ denotes the Kronecker product.

The divergence of $u(\mathfrak{r},t)$ is $$\nabla \cdot (u(\mathfrak{r},t)) = \frac{\partial u(\mathfrak{r},t)}{\partial x} + \frac{\partial u(\mathfrak{r},t)}{\partial y} \approx \mathfrak{L}^T \bar{\mathfrak{u}}(t).$$

Therefore $\nabla \cdot (\kappa(\mathfrak{r},t) \nabla u(\mathfrak{r},t)) \approx \mathfrak{L}^T \mathfrak{K}(t) \mathfrak{L}(t)$ where $\mathfrak{K}(t)$ is a n×n diagonal matrix with entries of semi-discretized $\kappa(\mathfrak{r},t)$. The two-dimensional diffusion system (10) becomes an ODE:

$$\frac{\partial \bar{\mathfrak{u}}(t)}{\partial t} = \mathfrak{L}^T \mathfrak{K}(t) \mathfrak{L} \mathfrak{u}(t) + \mathfrak{q}(t) \quad (11)$$

where $\mathfrak{L}^T \mathfrak{K}(t) \mathfrak{L}$ corresponds to the matrix $\mathfrak{A}$ in equation (2) and the size of $\mathfrak{L}^T \mathfrak{K}(t) \mathfrak{L}$ is n×n. $\mathfrak{L}^T \mathfrak{K}(t) \mathfrak{L}$, like $\mathfrak{A}$, is a representation of the discrete diffusion operator.

When using the implicit Euler method, equation (11) can be written as $$\frac{\mathfrak{u}^{j+1} - \mathfrak{u}^j}{h_t} = \mathfrak{L}^T \mathfrak{K}(t) \mathfrak{L} \mathfrak{u}^{j+1} + \bar{\mathfrak{q}}^{j+1}.$$

Then, given a $\bar{\mathfrak{u}}^j$ at each time step $j+1$, $\bar{\mathfrak{u}}^{j+1}$ can be solved by $$(\mathfrak{I} - h_t \mathfrak{L}^T \mathfrak{K}(t) \mathfrak{L}) \bar{\mathfrak{u}}^{j+1} = \bar{\mathfrak{u}}^j + h_t \bar{\mathfrak{q}}^{j+1} \quad (12)$$

Thus, the cost of each step of the implicit Euler method is the cost of solving the n×n system (12).

In the experimental setup, $n_x$ and $n_y$ are each set at 150, indicating a grid size of 150×150. $n_t$ is also set at 150, indicating 150 total time steps until computing the final error. The diffusion coefficient $\kappa(\mathbf{x},t)$ is set as $\kappa(x,t)=5$ and $\kappa(y,t)=5$. Other variables indicating granularity of space and time are $dx=10/(n_x-1)$; $dy=10/(n_y-1)$; and $dt=0.01$. The domain was of size 10 by 10, with each dimension subdivided into $n_x-1$ or $n_y-1$ subsections.

Figure 13A:
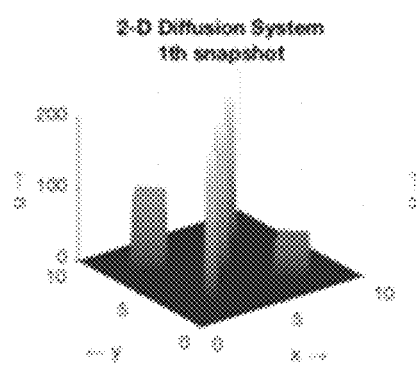
FIGS. 13A-13F show snapshots generated by an illustrative embodiment of the present invention.
Figure 13B:
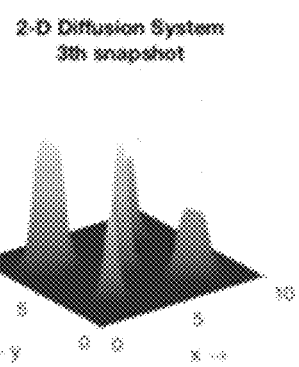
Figure 13C:
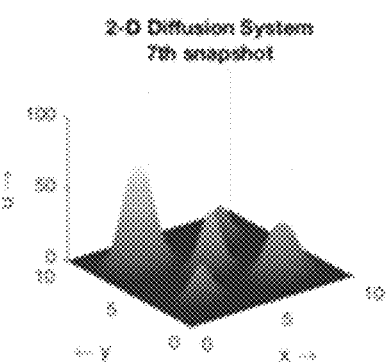
Figure 13D:
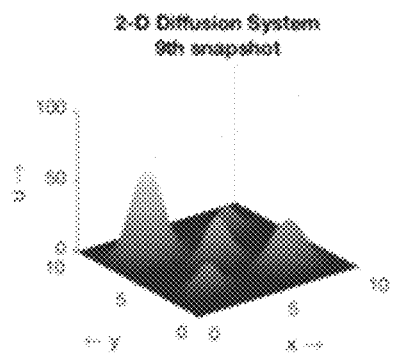
Figure 13E:
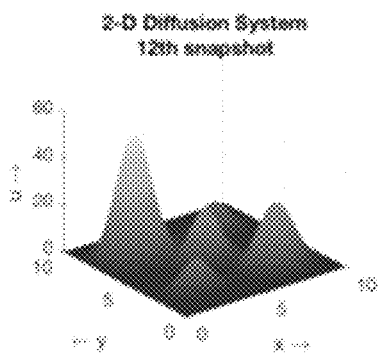
Figure 13F:
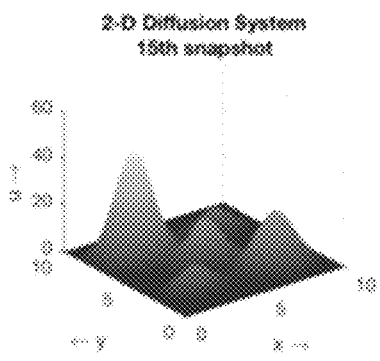

A set of snapshots of the solution are collected: $\{\bar{u}^1, \bar{u}^2, \ldots, \bar{u}^{n_s}\}$. FIGS. 13A-13F show examples of these snapshots. FIG. 13A shows the first snapshot ($\bar{u}^1$), FIG. 13B shows the third snapshot ($\bar{u}^3$), FIG. 13C shows the seventh snapshot ($\bar{u}^7$), FIG. 13D shows the ninth snapshot ($\bar{u}^9$), FIG. 13E shows the twelfth snapshot ($\bar{u}^{12}$), and FIG. 13F shows the fifteenth snapshot ($\bar{u}^{15}$). These sample snapshots allow for observation of the diffusion process. For example, because $\kappa_x$ is 5 and $\kappa_y$ is 2. the diffusion process rate along the x direction is faster than the diffusion process rate along they direction.

Figure 14A:
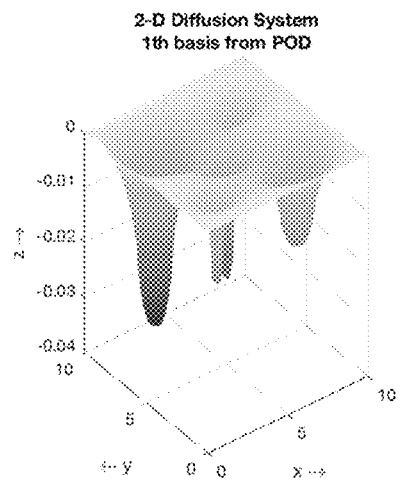
FIGS. 14A-14C show terms of a matrix-based POD basis.
Figure 14B:
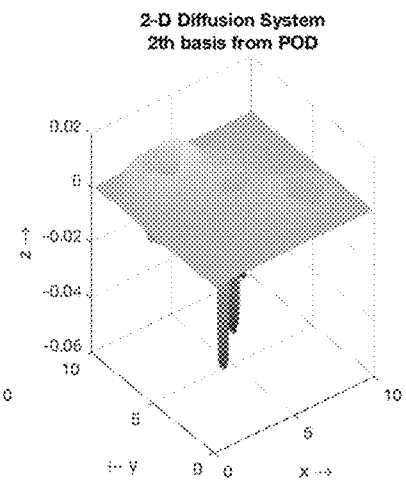
Figure 14C:
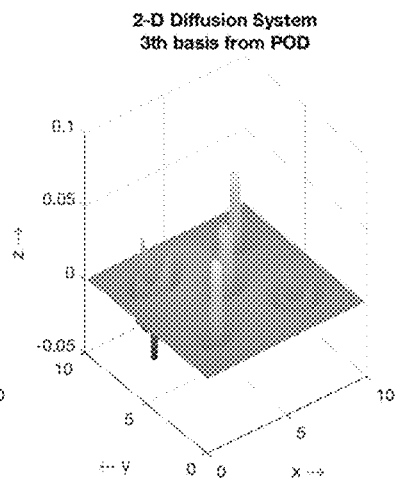
Figure 15A:
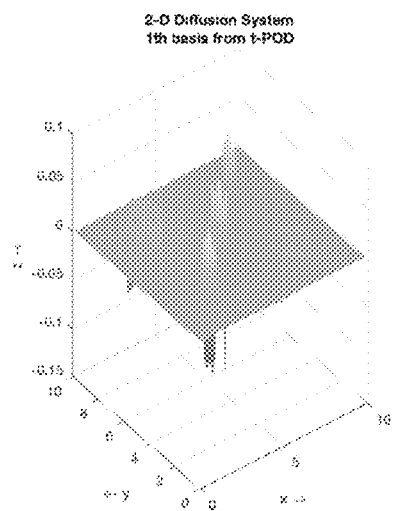
FIGS. 15A-15C terms of a tensor-based t-POD basis generated by an illustrative embodiment of the present invention.
Figure 15B:
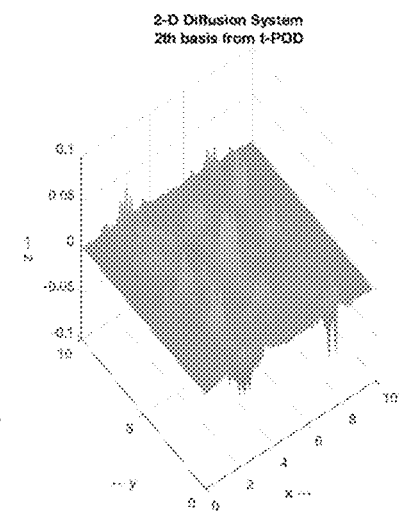
Figure 15C:
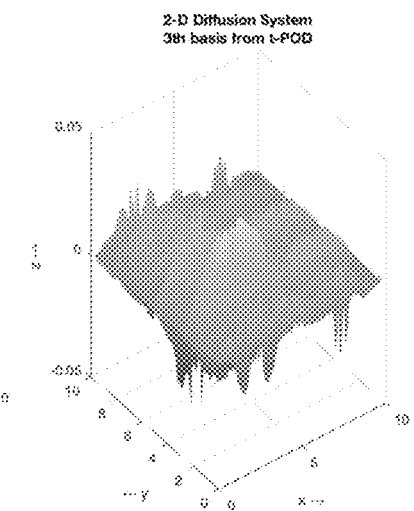

FIGS. 14A-14C show the first, second, and third terms of the matrix-based POD basis. FIGS. 15A-15C show the first, second, and third terms of the tensor-based t-POD basis. The first basis term in 15A can capture the peak values of snapshots data. The second basis term in FIG. 15B can capture the contour of snapshots data. The third basis term in FIG. 15C can identify the main diffusion direction to be in the x direction due to the higher diffusion coefficient along the x-axis. Comparing FIGS. 14 and 15 suggests that such information is not revealed by expanding using the matrix-based basis.

As previously mentioned, after a specified number of time steps, the final error is computed. The final error refers to the error relative to a solution computed without using POD. The final error of matrix based POD is defined as $$e_k^m = \frac{\|\bar{u}_{n_t} - \bar{u}_k\|_2}{\|\bar{u}_{n_t}\|_2}$$

and the final error of tensor based POD is defined as $$e_\rho^t = \frac{\|\bar{u}_{n_t} - \bar{u}_\rho\|_2}{\|\bar{u}_{n_t}\|_2}$$

where k and ρ are the number of snapshots used for formation of the projections, or more precisely, the truncation level used for the decomposition.

Figure 16:
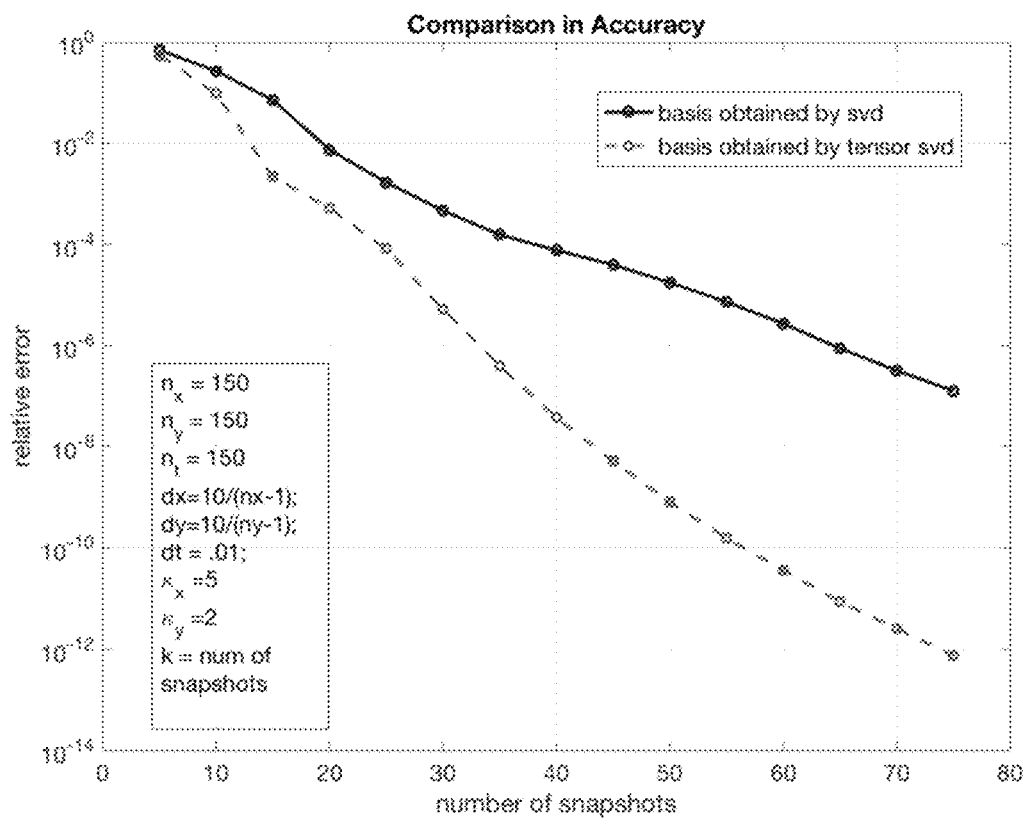
FIGS. 16 and 17 show experimental results comparing an illustrative embodiment of the present invention to conventional arrangements.

FIG. 16 is a graph showing experimental results generated using an illustrative embodiment of the invention. The solid line shows the relative error of the basis obtained by matrix-based SVD plotted against the number of snapshots, and the dashed line shows the relative error of the basis obtained by tensor-based SVD plotted against the number of snapshots. Here, the measurement is defined in the Frobenius norm. To compare the performance of POD and tensor POD when there are only a limited number of snapshots, r for the matrix case and ρ for the tensor case, as well as k for both cases, were each set equal to the number of snapshots s. FIG. 16 shows that the tensor POD method has a smaller error at the final time step than conventional matrix POD in approximating the solution of the two-dimensional diffusion system.

FIG. 16 also shows that, with increasing the number of snapshots, the errors of the tensor POD decreases more rapidly than the errors of the matrix POD. For example, when the number of snapshots equals 5, the relative errors of both tensor POD and matrix POD are about $10^{-1}$. However, when the number of snapshots equals 40, the relative error of the tensor POD quickly drops to about $10^{-7}$ or $10^{-8}$, while the relative error of the matrix POD remains at about $10^{-4}$.

Therefore, from the same snapshot data, the tensor-POD gives a more powerful projection basis in terms of preserving fidelity of the reduced order model (ROM) to the full model. In order for the matrix POD to perform as well, one would need to increase the number of snapshots substantially. But, to increase the number of snapshots would mean many more full-order implicit steps, and a cost of a matrix SVD that has more columns and whose representation isn't structured—these added costs would need to be balanced against using the one-sided tensor POD approach for much less snapshot data: so one can start using the ROM much sooner in the process, even though each individual solve costs more.

Thus, FIG. 16 demonstrates that for the same values of k, use of a tensor model gives more accurate reduced-order modeling (ROM) results. But since applying the POD in the tensor case is more expensive, the results also show that one can reduce the tensor truncation parameter and still get more accurate results.

Figure 17:
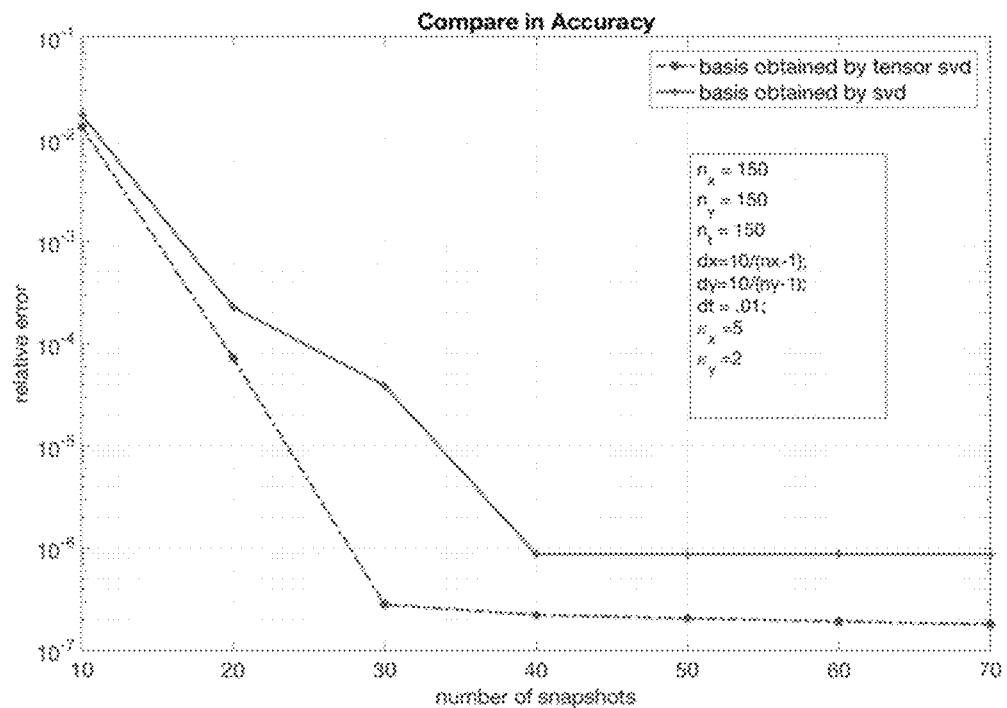

FIG. 17 is a graph showing additional experimental results generated using an illustrative embodiment of the invention. The solid line shows the relative error of the basis obtained by matrix-based SVD plotted against the number of snapshots, and the dashed line shows the relative error of the basis obtained by tensor-based SVD plotted against the number of snapshots. In FIG. 17, the effective rank is larger than the number of snapshots, the truncation level is fixed at 70 and q is fixed at 30. For the matrix-based SVD, r is varied, while for the tensor-based SVD, k is varied. For 70 snapshots, with a matrix truncation of 30, the accuracy of the tensor-based ROM gave an error of only about $4\times10^{-5}$. However, with q=30 and k=30 (for a ROM of size 900), the tensor-based ROM results improved by more than 2 orders of magnitude. Indeed, even if the truncation parameter for the matrix-based ROM is increased to equal the number of snapshots (70), the error rate remains higher than the tensor-based ROM where q=30=k. Thus, FIG. 17 shows that even for the multi-sided tensor approach requiring multiple (two in the 2D example) choices of truncation, the tensor approach for kr at or near the same order of magnitude as that of the truncation parameter for the matrix ROM we still observe the tensor 'basis' gives superior results in accuracy, for equivalent POD solver cost.

These theoretical and empirical results show that the proposed t-SVD approach must be at least as good as the celebrated matrix counterpart at representing the snapshot data, and is often better, for the same amount of basis element storage. The left t-SVD singular slices of snapshots arranged as a tensor are as, or more, informative basis elements compared to the left singular vectors of the same data arranged as a snapshot matrix. This important outcome indicates that the proposed framework may be valuable in applications beyond model reduction.

For a similar fidelity target of the reduced model, the proposed approach can learn the reduced subspace, using fewer snapshots. The ability to offer comparable fidelities, while supported by a smaller number of snapshots, is of great significance in situations where snapshots are formed by either computationally expensive, high fidelity simulation process, or by actual, time-consuming and often times expensive, experimentation.

An illustrative embodiment may provide a system and method for multi-dimensional multi-linear (e.g., t-linear) dynamical model reduction, for example, of a dynamical system modeled by a system of differential equations. Input data may include multi-dimensional snapshots of state representations, represented in native tensor structure.

For data of tensor degree n, the system may perform n−1 truncated tensor-tensor decompositions per tensor permutation upon the snapshot tensor. These tensor-tensor decompositions may include, for example, singular value decompositions or QR decompositions. These tensor-tensor decompositions may be performed with a predefined tensor-tensor product procedure, such as t-product or m-product. Truncation of the decompositions may be performed in accordance with user-defined parameters indicating truncation and/or fidelity properties, such as desired compression ratio, truncation indices, bounds on compression integrity, etc.

The decomposition may produce left singular tensors which form a reduced space basis for representation of the state of the dynamical system. For example, the state may be represented as a tensor-tensor product of the left singular tensor elements by a set of representation coefficients. The dynamical system could then be projected (e.g., Galerkin projection) by virtue of its product by the complex conjugated transpose of the left singular tensors to yield a reduced space-system of differential equations. For truncation indices smaller than the effective rank of the tensor, the resulting reduced-space system of differential equations is of smaller dimension than the original dynamical system, which allows for it to be solved more efficiently.

Illustrative embodiments offer compressed evolution of the state of a dynamical system of differential equations. Thus, illustrative embodiments enable approximated processing and/or simulation of dynamical systems. As discussed in, e.g., Haber et al., "Stable architectures for deep neural networks", Inverse Problems, Vol. 34, No. 1, Art. 014004, January 2018, 22 pages; Newman et al., "Stable Tensor Neural Networks for Rapid Deep Learning", Nov. 15, 2018, 20 pages; Niu et al., "Recurrent Neural Networks in the Eye of Differential Equations", Apr. 29, 2019, 33 pages, each of which is incorporated by reference herein for all purposes, a neural network can be viewed as a system of discrete differential equations. Specifically, the weight matrices of a neural network may be regarded as analogous to the snapshot matrices of a dynamical system. Thus, illustrative embodiments of the invention can provide an effective means for compression of neural networks.

One or more embodiments of the invention, or elements thereof, can be implemented, at least in part, in the form of an apparatus including a memory and at least one processor that is coupled to the memory and operative to perform exemplary method steps.

Figure 18:
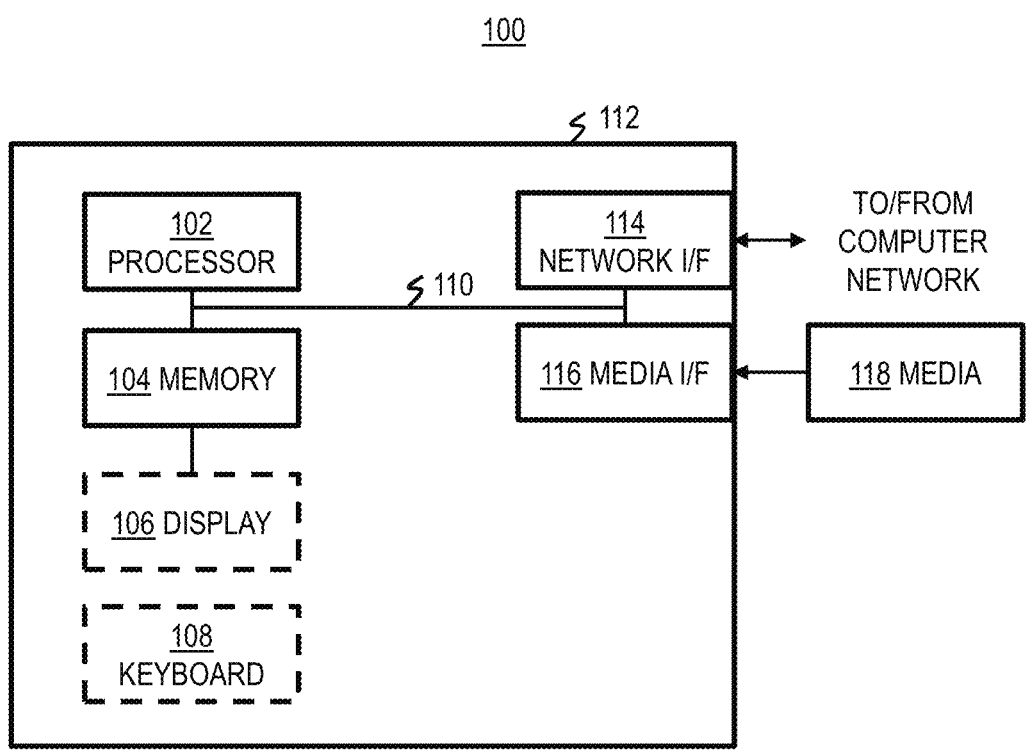
FIG. 18 shows a computer system that may be useful in implementing one or more aspects and/or elements of the invention.

One or more embodiments can make use of software running on a general purpose computer or workstation. With reference to FIG. 18, such an implementation might employ, for example, a processor 102, a memory 104, and an input/output interface formed, for example, by a display 106 and a keyboard 108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 102, memory 104, and input/output interface such as display 106 and keyboard 108 can be interconnected, for example, via bus 110 as part of a data processing unit 112. Suitable interconnections, for example via bus 110, can also be provided to a network interface 114, such as a network card, which can be provided to interface with a computer network, and to a media interface 116, such as a diskette or CD-ROM drive, which can be provided to interface with media 118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 102 coupled directly or indirectly to memory elements 104 through a system bus 110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 108, displays 106, pointing devices, and the like) can be coupled to the system either directly (such as via bus 110) or through intervening I/O controllers (omitted for clarity).

Network adapters such as network interface 114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 112 as shown in FIG. 18) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 102. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for solving a dynamical system, the method comprising:
    obtaining multidimensional snapshots representing respective discrete solutions of the dynamical system;
    storing the multidimensional snapshots within a snapshot tensor having an order of at least three;
    generating a basis for at least a subspace of a state space of the dynamical system at least in part by performing a decomposition of the snapshot tensor;
    deriving a reduced order model at least in part by using the basis to project the dynamical system from the state space onto the subspace; and
    solving the reduced order model of the dynamical system.

2. The method of claim 1, wherein the dynamical system comprises partial differential equations, and wherein the reduced order model comprises ordinary differential equations.

3. The method of claim 1, wherein the multidimensional snapshots are stored within the snapshot tensor without reshaping or flattening.

4. The method of claim 1, wherein the multidimensional snapshots are stored in lateral slices of the snapshot tensor.

5. The method of claim 1, wherein the decomposition of the snapshot tensor is a singular value decomposition.

6. The method of claim 5, wherein the singular value decomposition is truncated in accordance with one or more user-defined parameters.

7. The method of claim 5, wherein the singular value decomposition is computed in parallel across frontal slices of the snapshot tensor.

8. The method of claim 5, wherein the singular value decomposition is performed with a tensor-tensor product other than a t-product.

9. The method of claim 8, wherein the singular value decomposition is performed in a transform domain other than a Fourier transform domain.

10. The method of claim 8, wherein the singular value decomposition is performed with an m-product.

11. The method of claim 1, wherein the basis comprises a tensor having an order of at least three.

12. The method of claim 11, wherein the basis comprises left singular slices of the snapshot tensor.

13. The method of claim 11, wherein using the basis to project the dynamical system comprises applying a Galerkin projection using a conjugate transpose of the basis.

14. The method of claim 1, wherein the snapshots represent respective discrete solutions of the dynamical system at different times.

15. The method of claim 1, wherein the snapshots represent respective discrete solutions of the dynamical system with different initial or boundary conditions.

16. The method of claim 1, wherein deriving the reduced order model comprises multi-sided dimension reduction of the dynamical system.

17. The method of claim 16, wherein the basis is generated at least in part by factorization of the snapshot tensor over a first ring corresponding to a first orientation of the snapshot tensor, and wherein the reduced order model is generated at least in part by factorization of the snapshot tensor over a second ring corresponding to a second orientation of the snapshot tensor.

18. The method of claim 16, wherein the reduced order model is generated at least in part by:
    computing a projection over the first ring of the snapshot tensor;
    finding a decomposition over the second ring of a permutation of the projection over the first ring; and
    using the decomposition to perform a q-term projection over the second ring of the permutation of the projection over the first ring.

19. The method of claim 1, wherein the dynamical system comprises a neural network, wherein the multidimensional snapshots correspond to one or more weight matrices of the neural network, and wherein deriving the reduced order model comprises compressing the neural network.

20. An apparatus for solving a dynamical system, the apparatus comprising:
    a memory; and
    at least one processor coupled to the memory, the processor being operative:
        to obtain multidimensional snapshots representing respective discrete solutions of the dynamical system;
        to store the multidimensional snapshots within a snapshot tensor having an order of at least three;
        to generate a basis for at least a subspace of a state space of the dynamical system at least in part by performing a decomposition of the snapshot tensor;
        to derive a reduced order model at least in part by using the basis to project the dynamical system from the state space onto the subspace; and
        to solve the reduced order model of the dynamical system.

21. A computer program product for solving a dynamical system, the computer program product comprising a non-transitory machine-readable storage medium having machine-readable program code embodied therewith, said machine-readable program code comprising other machine-readable program code configured:
- to obtain multidimensional snapshots representing respective discrete solutions of the dynamical system;
- to store the multidimensional snapshots within a snapshot tensor having an order of at least three:
- to generate a basis for at least a subspace of a state space of the dynamical system at least in part by performing a decomposition of the snapshot tensor;
- to derive a reduced order model at least in part by using the basis to project the dynamical system from the state space onto the subspace; and
- to solve the reduced order model of the dynamical system.

* * * * *